(12) United States Patent
Park et al.

(10) Patent No.: US 11,132,537 B2
(45) Date of Patent: Sep. 28, 2021

(54) ELECTRONIC DEVICE FOR DETERMINING POSITION OF USER BASED ON IMAGE PIXELS, AND METHOD OF CONTROLLING SAID DEVICE

(71) Applicant: Samsung Electronics Co., Ltd., Suwon-si (KR)

(72) Inventors: Sun-Eung Park, Suwon-si (KR); Zhongwei Liu, Suwon-si (KR); Hyun-Cheol Park, Suwon-si (KR); Tae-Kwang Um, Suwon-si (KR); Jeong-Yi Park, Suwon-si (KR); Si-Jun Lee, Suwon-si (KR); Soo-In Jang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 238 days.

(21) Appl. No.: 15/773,836

(22) PCT Filed: Oct. 11, 2016

(86) PCT No.: PCT/KR2016/011384
§ 371 (c)(1),
(2) Date: May 4, 2018

(87) PCT Pub. No.: WO2017/078283
PCT Pub. Date: May 11, 2017

(65) Prior Publication Data
US 2018/0330154 A1 Nov. 15, 2018

(30) Foreign Application Priority Data
Nov. 5, 2015 (KR) .................. 10-2015-0155183

(51) Int. Cl.
*H04N 5/225* (2006.01)
*H04N 5/222* (2006.01)
(Continued)

(52) U.S. Cl.
CPC ..... *G06K 9/00369* (2013.01); *G06K 9/00771* (2013.01); *G06K 9/209* (2013.01);
(Continued)

(58) Field of Classification Search
CPC ...... G06K 9/00771; G06K 9/209; G06K 9/46; H04N 5/2226; H04N 5/225
See application file for complete search history.

(56) References Cited

U.S. PATENT DOCUMENTS

2012/0146906 A1 6/2012 Song
2012/0250980 A1* 10/2012 Gillard ............... H04N 5/2226
382/154

(Continued)

FOREIGN PATENT DOCUMENTS

JP 2006-030819 A 2/2006
JP 2006-277076 A 10/2006
(Continued)

*Primary Examiner* — Idowu O Osifade
(74) *Attorney, Agent, or Firm* — Jefferson IP Law, LLP

(57) ABSTRACT

This electronic device comprises: a sensor including a plurality of pixels disposed in a first direction; a processor electrically connected to the sensor; and a memory electrically connected to the processor. When implemented, the processor uses sensing data sensed by the sensor and determine user position information, and the memory may store instructions for carrying out a movement corresponding to the user position information.

18 Claims, 28 Drawing Sheets

(51) Int. Cl.
  *G06K 9/00* (2006.01)
  *G06K 9/20* (2006.01)
  *G06K 9/46* (2006.01)
(52) U.S. Cl.
  CPC .............. *G06K 9/46* (2013.01); *H04N 5/225* (2013.01); *H04N 5/2226* (2013.01)

(56) References Cited

U.S. PATENT DOCUMENTS

| | | | |
|---|---|---|---|
| 2013/0044081 A1 | 2/2013 | Wu et al. | |
| 2014/0047464 A1 | 2/2014 | Lev et al. | |
| 2015/0002419 A1* | 1/2015 | White | G06F 3/04847 345/173 |
| 2015/0054928 A1* | 2/2015 | Wu | H04N 13/305 348/59 |
| 2015/0062004 A1* | 3/2015 | Rafii | G06F 3/0304 345/156 |
| 2015/0177906 A1* | 6/2015 | Yairi | G06F 3/016 345/648 |
| 2016/0196468 A1* | 7/2016 | Hoof | A63F 13/213 382/103 |
| 2016/0205391 A1* | 7/2016 | Kim | G09G 3/3225 348/51 |
| 2016/0375339 A1* | 12/2016 | Lee | G06K 9/00362 482/7 |

FOREIGN PATENT DOCUMENTS

| | | |
|---|---|---|
| JP | 2011-247983 A | 12/2011 |
| KR | 10-2011-0016165 A | 2/2011 |
| KR | 10-2012-0092809 A | 8/2012 |
| WO | 2009-151186 A1 | 12/2009 |

* cited by examiner

| 1311 | 1312 | 1313 | 1314 | 1315 | 1316 | 1317 | 1318 | 1319 | 1320 | 1321 | 1322 | 1323 | 1324 |
|---|---|---|---|---|---|---|---|---|---|---|---|---|---|
| 119 | 113 | 128 | 139 | 45 | 3 | 4 | 5 | 94 | 109 | 135 | 141 | 15 | 18 |

ELECTRONIC DEVICE FOR DETERMINING POSITION OF USER BASED ON IMAGE PIXELS, AND METHOD OF CONTROLLING SAID DEVICE

PRIORITY

This application is a National Phase Entry of PCT International Application No. PCT/KR2016/011384, which was filed on Oct. 11, 2016, and claims priority to Korean Patent Application No. 10-2015-0155183, which was filed on Nov. 5, 2015, the contents of which are incorporated herein by reference.

TECHNICAL FIELD

The present disclosure relates to an electronic device for determining the position of a user and a method for controlling the same and, more particularly, to an electronic device for performing an operation corresponding to the determined position of a user and a method for controlling the same.

BACKGROUND ART

Conventionally, as a method for recognizing the position of a user indoors, a method using a camera and a method using a sensor have been proposed. In the method using the camera, a conventional electronic device receives images in real time and recognizes a user via an image processing technique. Further, the conventional electronic device may calculate precise information, such as the distance or angle between the electronic device and a user, using two cameras. The conventional electronic device, for example, a TV, may include a camera disposed at the center of an upper bezel and may determine user position information using images captured by the camera. In the method using the sensor, a conventional electronic device may employ a light level sensor or an ultrasonic sensor and may determine the presence or absence of a user or the distance from a user to the electronic device. The method using the sensor is advantageous in terms of cost.

DETAILED DESCRIPTION OF THE INVENTION

Technical Problem

A method using a camera requires relatively expensive hardware and a great amount of computation for image processing. In addition, since an electronic device needs to include a camera, an installation space is required, making it difficult to miniaturize the electronic device. Further, as hacking into electronic devices have frequently occurred in recent years, when electronic devices using a camera are hacked, the privacy of users may be breached. A method using a sensor can determine merely the presence or absence of a user due to low accuracy and resolution.

Therefore, to overcome the disadvantages of the two methods, it is required to develop an electronic device and a method for controlling the same that are capable of obtaining detailed user position information while reducing the possible invasion of privacy.

Technical Solution

According to various embodiments of the present disclosure, an electronic device may include: a sensor configured to include a plurality of pixels disposed in a first direction; a processor configured to be electrically connected to the sensor; and a memory configured to be electrically connected to the processor, wherein the memory may store an instruction that, when executed, enables the processor to determine position information on a user using sensing data sensed by the sensor and to perform an operation corresponding to the position information on the user.

According to various embodiments of the present disclosure, a control method of an electronic device including a plurality of pixels disposed in a first direction may include: determining position information on a user using sensing data sensed by the plurality of pixels; and performing an operation corresponding to the position information on the user.

Advantageous Effects

According to various embodiments of the present disclosure, there may be provided the development of an electronic device and a method for controlling the same that are capable of obtaining detailed user position information while reducing the possible invasion of privacy. In particular, a sensor array can be made small and thus has relatively less restriction in a position for disposition. Thus, the sensor array may be disposed at any position where user position information is required.

BRIEF DESCRIPTION OF DRAWINGS

The above and other aspects, features and advantages of the present disclosure will be more apparent from the following detailed description taken in conjunction with the accompanying drawings, in which.

MODE FOR CARRYING OUT THE INVENTION

Figure 1:
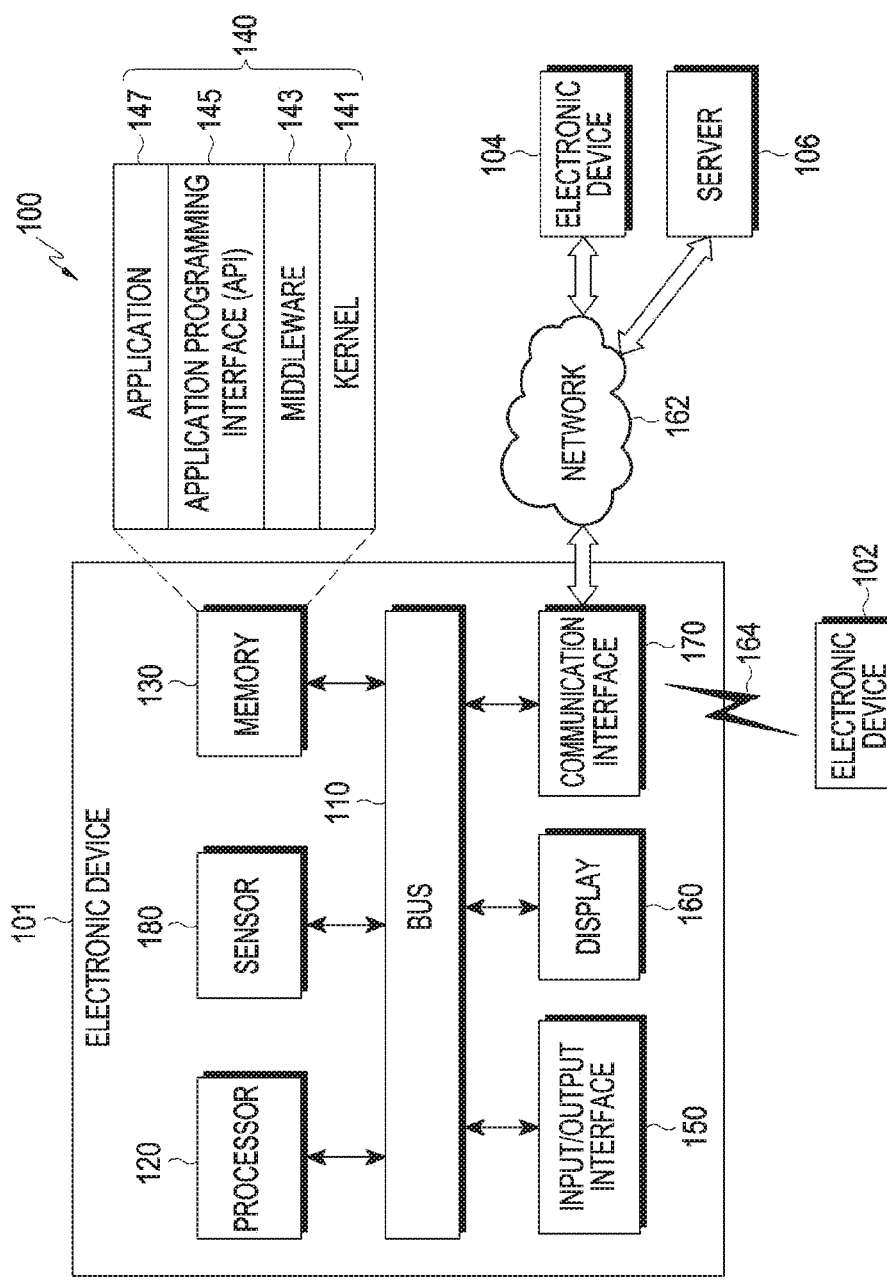
FIG. 1 is a block diagram illustrating an electronic device and a network according to various exemplary embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In addition, the electronic device may wirelessly receive power from a wireless power transmitter and thus may be called wireless power receiver.

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates an electronic device 101 in a network environment 100 according to various exemplary embodiments. The electronic device 101 may include a bus 110, a processor 120, a memory 130, an input/output interface 150, a display 160, and a communication module 170. In some embodiments, at least one of the components may be omitted, or additional components may be further included in the electronic device 101.

The bus 110 may include, for example, a circuit that connects the components 110 to 170 to each other and delivers communications (for example, control messages and/or data) between the components.

The processor 120 may include one or more of a Central Processing Unit (CPU), an Application Processor (AP), and a Communication Processor (CP). The processor 120 may control, for example, at least one different component of the electronic device 101, and/or may perform operations relating to communication or data processing.

The memory 130 may include a volatile and/or nonvolatile memory. The memory 130 may store, for example, a command or data related to at least one different component of the electronic device 101. According to one exemplary embodiment, the memory 130 may store software and/or a program 140. The program 140 may include, for example, a kernel 141, middleware 143, an Application Programming Interface (API) 145, and/or an application (or "app") 147. At least part of the kernel 141, the middleware 143, and the API 145 may be designated as an Operating System (OS).

The kernel 141 may control or manage system resources (for example, the bus 110, the processor 120, the memory 130, or the like) used to perform an operation or function implemented in other programs (for example, the middleware 143, the API 145, or the application 147). Further, the kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data.

Further, the middleware 143 may process one or more requests for operations received from the application 147 according to the priority thereof. For example, the middleware 143 may assign at least one application 147 a priority for using a system resource of the electronic device 101 (for example, the bus 110, the processor 120, the memory 130, or the like). For example, the middleware 143 may process the one or more requests for operations according to the priority assigned to the at least one application, thereby performing scheduling or load balancing for the one or more requests for operations.

The API 145 is, for example, an interface for the application 147 to control a function provided from the kernel 141 or the middleware 143, and may include, for example, at least one interface or function (for example, a command) for file control, window control, image processing, or text control.

The input/output interface 150 may serve as an interface that delivers a command or data, which is input from, for example, a user or a different external device, to a different component(s) of the electronic device 101. Further, the input/output interface 150 may output a command or data, which is received from a different component(s) of the electronic device 101, to the user or to the different external device.

The display 160 may include, for example, a Liquid Crystal Display (LCD), a Light-Emitting Diode (LED) display, an Organic Light-Emitting Diode (OLED) display, a Micro-Electro-Mechanical Systems (MEMS) display, or an electronic paper display. The display 160 may display, for example, various types of content (for example, text, an image, a video, an icon, a symbol, or the like) for the user. The display 160 may include a touch screen and may receive touch, gesture, proximity, or hovering input using, for example, an electronic pen or a body part of a user.

The communication module 170 may establish communication, for example, between the electronic device 101 and an external device (for example, a first external electronic device 102, a second external electronic device 104, or a server 106). For example, the communication module 170 may be connected to a network 162 via wireless communication or wired communication to communicate with the external device (for example, the second external electronic device 104 or the server 106).

A sensor 180 may include a plurality of pixels arranged in a first direction, may sense sensing data corresponding to a one-dimensional image, and may output the sensing data to the processor 120. The sensor 180 will be described in detail later.

The wireless communication may use, for example, a cellular communication protocol, which may be, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). Further, the wireless communication may include, for example, short-range communication 164. The short-range communication 164 may include, for example, at least one of Wireless Fidelity (Wi-Fi), Bluetooth, Near-Field Communication (NFC), and Global Navigation Satellite System (GNSS). The GNSS may include, for example, at least one of a Global Positioning System (GPS), a Global Navigation Satellite System (GNSS), a BeiDou Navigation Satellite System (hereinafter, "BeiDou"), and Galileo, which is the European global satellite-based navigation system, depending on the use area or bandwidth. In the present document, "GPS" may be interchangeably used with "GNSS" hereinafter. The wired communication may include, for example, at least one of Universal Serial Bus (USB), High-Definition Multimedia Interface (HDMI), Recommended Standard 232 (RS-232), and Plain Old Telephone Service (POTS). The network 162 may include a telecommunications network, which may be, for example, at least one of a computer network (for example, a Local Area Network (LAN) or Wide Area Network (WAN)), the Internet, and a telephone network.

Each of the first and second external electronic devices 102 and 104 may be a device of a type that is the same as, or different from, that of the electronic device 101. According to one exemplary embodiment, the server 106 may include a group of one or more servers. According to various exemplary embodiments, all or some of the operations performed in the electronic device 101 may be performed in another electronic device or a plurality of electronic devices (for example, the electronic devices 102 and 104 or the server 106). According to one exemplary embodiment, when the electronic device 101 needs to perform a function or service automatically or upon request, the electronic device 101 may request another electronic device (for example, the electronic device 102 or 104, or the server 106) to perform at least some functions related to the function or service, instead of, or in addition to, autonomously performing the function or service. The other electronic device (for example, the electronic device 102 or 104, or the server 106) may perform the requested functions or additional functions and may transmit the result thereof to the electronic device 101. The electronic device 101 may provide the requested function or service using the same received result or after additionally processing the result. To this end, cloud-computing, distributed-computing, or client-server-computing technologies may be used.

According to various embodiments of the present disclosure, the memory 130 may store an instruction that, when executed, enables the processor 120 to determine position information on a user using sensing data sensed by the sensor and to perform an operation corresponding to the position information on the user.

According to various embodiments of the present disclosure, the memory 130 may store an instruction that, when executed, enables the processor 120 to divide the plurality of pixels into pixels corresponding to a background and pixels corresponding to a person using the sensing data and to determine the position information on the user on the basis of the pixels corresponding to the person.

According to various embodiments of the present disclosure, the memory 130 may store an instruction that, when executed, enables the processor 120 to determine a feature point from the sensing data and to divide the plurality of pixels into the pixels corresponding to the background and the pixels corresponding to the person using the sensing data on the basis of the determined feature point.

According to various embodiments of the present disclosure, the memory 130 may store an instruction that, when executed, enables the processor 120 to determine a horizontal position or a vertical position of the user on the basis of the pixels corresponding to the person.

According to various embodiments of the present disclosure, the memory 130 may store an instruction that, when executed, enables the processor 120 to determine information on a distance between the user and the electronic device on the basis of a number of the pixels corresponding to the person.

According to various embodiments of the present disclosure, each of the plurality of pixels of the sensor 180 may include a plurality of sub-pixels, and the memory 130 may store an instruction that, when executed, enables the processor 120 to determine information on a distance between the user and the electronic device on the basis of a difference between pieces of sensing data sensed by a plurality of sub-pixels of each of the pixels corresponding to the person.

According to various embodiments of the present disclosure, the sensor 180 may include a first pixel array including a plurality of pixels disposed in the first direction and a second pixel array including a plurality of other pixels disposed in the first direction, and the memory 130 may store an instruction that, when executed, enables the processor 120 to determine information on a distance between the user and the electronic device on the basis of a difference between pixels corresponding to the person in the first pixel array and pixels corresponding to the person in the second pixel array.

According to various embodiments of the present disclosure, the memory 130 may store an instruction that, when executed, enables the processor 120 to apply a stereo vision technique to the pixels corresponding to the person in the first pixel array and the pixels corresponding to the person in the second pixel array and to determine the information on the distance between the user and the electronic device on the basis of an application result.

According to various embodiments of the present disclosure, the memory 130 may store in advance a reference database associated with the sensing data, and may store an instruction that, when executed, enables the processor 120 to compare the sensing data with the reference database and to determine the position information on the user using a comparison result.

According to various embodiments of the present disclosure, the memory 130 may store an instruction that, when executed, enables the processor 120 to generate a difference image between the sensing data and the reference database, to divide a plurality of pixels of the difference image into pixels corresponding to the background and pixels corresponding to the person, and to determine the position information on the user on the basis of the pixels corresponding to the person.

According to various embodiments of the present disclosure, the sensor 180 may sense a plurality of pieces of sensing data over time, and the memory 130 may store an instruction that, when executed, enables the processor 120 to divide the plurality of pixels into pixels corresponding to the background and pixels corresponding to the person using each of the plurality of pieces of sensing data sensed over time, and to determine movement information on the user on the basis of a change in the pixels corresponding to the person over time.

Figure 2:
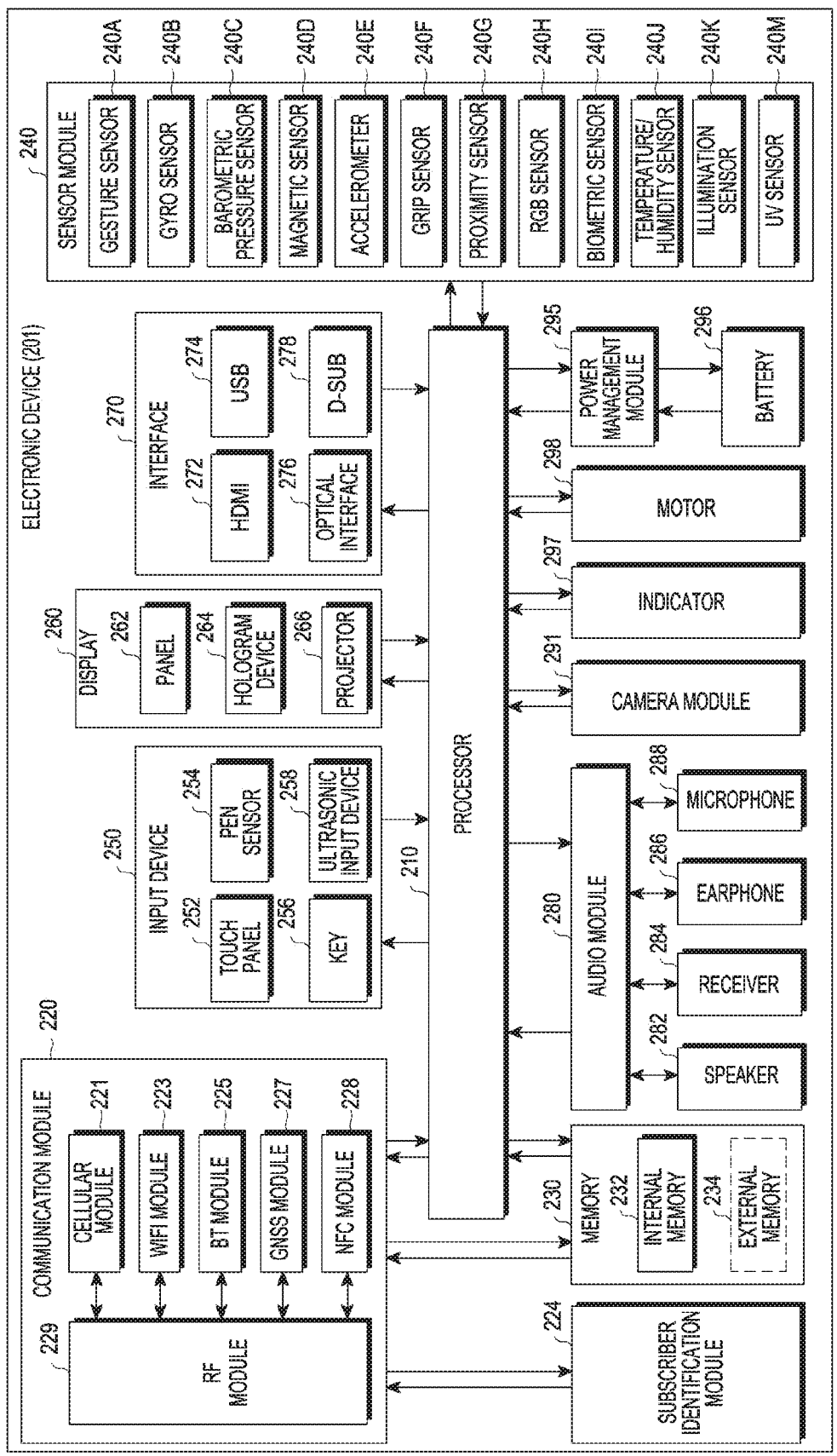
FIG. 2 is a block diagram of an electronic device according to various exemplary embodiments.

FIG. 2 is a block diagram of an electronic device 201 according to various exemplary embodiments. The electronic device 201 may include, for example, all or part of the electronic device 101 illustrated in FIG. 1. The electronic device 201 may include one or more processors (for example, Application Processors (APs)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processors 210 may run, for example, an operating system or an application to control a plurality of hardware or software components that are connected to the processors 210, and may perform various kinds of data processing and operations. The processors 210 may be configured, for example, as a System on Chip (SoC). According to one exemplary embodiment, the processors 210 may further include a Graphic Processing Unit (GPU) and/or an image signal processor. The processors 210 may include at least some (for example, a cellular module 221) of the components illustrated in FIG. 2. The processors 210 may load a command or data received from at least one of other components (for example, nonvolatile memory) into volatile memory to process the command or data, and may store various types of data in the nonvolatile memory.

The communication module 220 may have a configuration that is the same as, or similar to, that of the communication module 170 in FIG. 1. The communication module 220 may include, for example, a cellular module 221, a Wi-Fi module 223, a Bluetooth module 225, a global navigation satellite system (GNSS) module 227 (for example, a global positioning system (GPS) module, a GLONASS module, a BeiDou module, or a Galileo module), a Near-Field Communication (NFC) module 228, and a radio frequency (RF) module 229.

The cellular module 221 may provide, for example, a voice call, a video call, a text messaging service, or an Internet service through a communication network. According to one exemplary embodiment, the cellular module 221 may perform identification and authentication of the electronic device 201 in a communication network using a Subscriber Identity Module (SIM, for example, a SIM card) 224. According to one exemplary embodiment, the cellular module 221 may perform at least some of the functions provided by the processors 210. According to one exemplary embodiment, the cellular module 221 may include a Communication Processor (CP).

The Wi-Fi module 223, the Bluetooth module 225, the GNSS module 227, and the NFC module 228 may each include a processor to process data transmitted and received via the respective modules. According to one exemplary embodiment, at least some (for example, two or more) of the cellular module 221, the Wi-Fi module 223, the Bluetooth module 225, the GNSS module 227, and the NFC module 228 may be included in one Integrated Circuit (IC) or IC package.

The RF module 229 may transmit and receive, for example, a communication signal (for example, an RF signal). The RF module 229 may include, for example, a transceiver, a Power Amplifier (amp) Module (PAM), a frequency filter, a Low-Noise Amplifier (LNA), an antenna, or the like. According to another embodiment, at least one of the cellular module 221, the Wi-Fi module 223, the Bluetooth module 225, the GNSS module 227, and the NFC module 228 may transmit and receive an RF signal through a separate RF module.

The SIM 224 may include, for example, a card including a SIM and/or an embedded SIM, and may include unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random-Access Memory (DRAM), a Static RAM (SRAM), a Synchronous Dynamic RAM (SDRAM), or the like) and a nonvolatile memory (for example, a One-Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, an NAND flash, an NOR flash, or the like), a hard drive, or a Solid-State Drive (SSD)).

The external memory 234 may further include a flash drive, for example, a Compact Flash (CF), a Secure Digital (SD), a micro Secure Digital (micro-SD), a mini Secure Digital (mini-SD), an extreme digital (xD), a Multi-Media Card (MMC), a memory stick, or the like. The external memory 234 may be functionally and/or physically connected to the electronic device 201 through any of various interfaces.

The sensor module 240 may measure, for example, physical quantities, or may detect the state of operation of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, and an illumination sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one exemplary embodiment, the electronic device 201 may further include a processor configured, as a part of the processors 210 or separately from the processors 210, to control the sensor module 240, thereby controlling the sensor module 240 while the processors 210 are in a sleep state.

The input device 250 may include, for example, a touch panel 252, a (digital) pen sensor 254, a key 256, or an ultrasonic input device 258. The touch panel 252 may be, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel or may include a separate recognition sheet. The key 256 may include, for example, a physical button, an optical key, or a keypad. The ultrasonic input device 258 may detect ultrasonic waves generated in an input tool through a microphone (for example, a microphone 288) and may identify data corresponding to the detected ultrasonic waves.

The display 260 (for example, the display 160) may include a panel 262, a hologram device 264, or a projector 266. The panel 262 may include a configuration that is the same as, or similar to, that of the display 160 of FIG. 1. The panel 262 may be configured, for example, to be flexible, transparent, or wearable. The panel 262 may be formed with the touch panel 252 in a single module. The hologram device 264 may display a three-dimensional image in the air using light interference. The projector 266 may project light onto a screen to display an image. The screen may be disposed, for example, inside or outside the electronic device 201. According to one exemplary embodiment, the display 260 may further include a control circuit to control the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) interface 278. The interface 270 may be included, for example, in the communication module 170 illustrated in FIG. 1. Additionally or alternatively, the interface 270 may include, for example, a Mobile High-Definition Link (MHL) interface, a Secure Digital (SD) card/Multi-Media Card (MMC) interface, or an Infrared Data Association (IrDA) interface.

The audio module 280 may bidirectionally convert, for example, a sound and an electrical signal. At least some components of the audio module 280 may be included, for example, in the input/output interface 150 illustrated in FIG. 1. The audio module 280 may process sound information input or output, for example, through a speaker 282, a receiver 284, earphones 286, or the microphone 288.

The camera module 291 is a device that takes, for example, a still image and a video. According to one exemplary embodiment, the camera module 291 may include one or more image sensors (for example, a front sensor or a rear sensor), a lens, an Image Signal Processor (ISP), or a flash (for example, an LED, a xenon lamp, or the like).

The power management module 295 may manage, for example, the power of the electronic device 201. According to one exemplary embodiment, the power management module 295 may include a Power Management Integrated Circuit (PMIC), a charger Integrated Circuit (IC), or a battery or fuel gauge. The PMIC may have wired and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 296. The battery 296 may include, for example, a rechargeable battery and/or a solar battery.

The indicator 297 may display the specific state of the electronic device 201 or a component thereof (for example, the processors 210), which may be, for example, a booting state, a message state, or a charging state. The motor 298 may convert an electrical signal into mechanical vibrations, and may generate vibrations or a haptic effect. Although not shown, the electronic device 201 may include a processing device for supporting a mobile TV (for example, a GPU). The processing device for supporting the mobile TV may process media data in accordance with Digital Multimedia Broadcasting (DMB), Digital Video Broadcasting (DVB), or mediaFlo™ standards.

Figure 3:
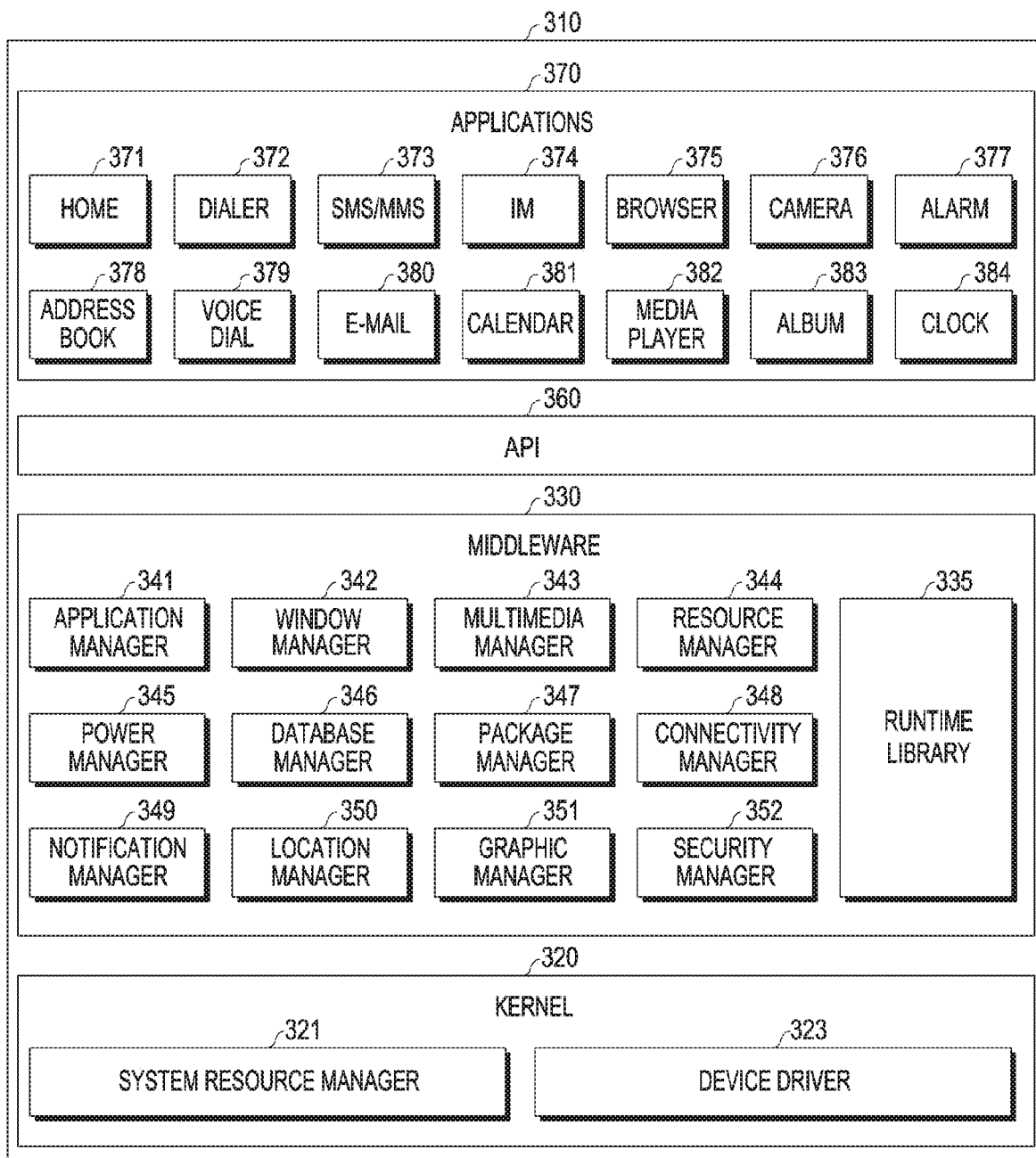
FIG. 3 is a block diagram illustrating a program module according to various exemplary embodiments.

FIG. 3 is a block diagram illustrating a program module according to various exemplary embodiments. According to one exemplary embodiment, the program module 310 (for example, the program 140) may include an Operating System (OS) that controls resources related to an electronic device (for example, the electronic device 101) and/or various applications (for example, the application 147) that run on the OS. The OS may be, for example, Android, iOS, Windows, Symbian, Tizen, Bada, or the like.

The program module 310 may include a kernel 320, middleware 330, an API 360, and/or an application 370. At least part of the program module 310 may be preloaded onto the electronic device, or may be downloaded from an external electronic device (for example, the electronic device 102 or 104, the server 106, or the like).

The kernel 320 (for example, the kernel 141) may include, for example, a system resource manager 321 and/or a device driver 323. The system resource manager 321 may perform control, allocation, or recovery of system resources. According to one exemplary embodiment, the system resource manager 321 may include a process management unit, a memory management unit, or a file-system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, functions commonly needed for applications 370, or may provide the applications 370 with various functions through the API 360 so that the applications 370 may efficiently use the limited systems resources in the electronic device. According to one exemplary embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 355 may include, for example, a library module used by a complier to add a new function through a programming language while the application 370 is running. The runtime library 355 may perform functions for input/output management, memory management, or arithmetic functions.

The application manager 341 may manage, for example, the life cycle of at least one application among the applications 370. The window manager 342 may manage graphic user interface (GUI) resources used for a screen. The multimedia manager 343 may identify formats that are necessary to play various media files, and may encode or decode a media file using a codec suitable for a corresponding format. The resource manager 344 may manage resources, such as a source code, a memory, or a storage space, for at least one application among the applications 370.

The power manager 345 may operate with, for example, a basic input/output system (BIOS) to manage a battery or power supply and may provide information on power necessary for operation of the electronic device. The database manager 346 may generate, retrieve, or change a database to be used for at least one application among the applications 370. The package manager 347 may install or update an application distributed in the form of a package file.

The connectivity manager 348 may manage wireless connectivity via, for example, Wi-Fi or Bluetooth. The notification manager 349 may display or report an incoming message, an appointment, and an event including a proximity notification in a manner that does not disturb a user. The location manager 350 may manage position information on the electronic device. The graphic manager 351 may manage a graphic effect to be provided for the user or a user interface related to the graphic effect. The security manager 352 may provide overall security functions necessary for system security or user authentication. According to one exemplary embodiment, when the electronic device (for example, the electronic device 101) has phone features, the middleware 330 may further include a telephony manager to manage a voice or video call function of the electronic device.

The middleware 330 may include a middleware module that forms combinations of various functions of the foregoing components. The middleware 330 may provide a specialized module for each type of OS in order to provide differentiated functions. Further, the middleware 330 may dynamically delete some of the existing components or add new components.

The API 360 (for example, the API 145) is, for example, a set of API programming functions, and may be provided with a different configuration depending on the OS. For example, one API set for each platform may be provided in the case of Android or iOS, while two or more API sets for each platform may be provided in the case of Tizen.

The application 370 (for example, the application 147) may include one or more applications that are capable of performing functions of, for example, a home screen 371, a dialer 372, SMS/MMS 373, instant messaging (IM) 374, a browser 375, a camera 376, an alarm 377, an address book 378, a voice dialer 379, email 380, a calendar 381, a media player 382, an album 383, a clock 384, or health care (for example, for measuring exercising or blood sugar), an environmental data application (for example, for providing atmospheric pressure, humidity, or temperature data), or the like.

According to one exemplary embodiment, the application 370 may include an application (hereinafter, "information exchange application" for convenience of description) that supports information exchange between the electronic device (for example, the electronic device 101) and an external electronic device (for example, the electronic device 102 or 104). The information exchange application may include, for example, a notification relay application for relaying specific information to the external electronic device or a device management application for managing the external electronic device.

For example, the notification relay application may include a function of relaying notification information, which is generated in another application (for example, an SMS/MMS application, an email application, a health care application, an environmental data application, or the like) of the electronic device, to the external electronic device (for example, the electronic device 102 or 104). Additionally, the notification relay application may receive notification information, for example, from the external electronic device and may provide the notification information to the user.

The device management application may manage (for example, install, delete, or update), for example, at least one function (for example, a function of turning on/turning off the external electronic device itself (or some components) or adjusting the brightness (or resolution) of a display) of the external electronic device (for example, the electronic device 102 or 104) communicating with the electronic device, an application operating in the external electronic device, or a service (for example, a call service or message service) provided by the external electronic device.

According to one exemplary embodiment, the application 370 may include an application (for example, a health care application of a mobile medical device) assigned according to the attributes of the external electronic device (for example, the electronic device 102 or 104). According to one exemplary embodiment, the application 370 may include an application received from the external electronic device (for example, the server 106 or the electronic device 102 or 104). According to one exemplary embodiment, the application 370 may include a preloaded application or a third-party application that may be downloaded from a server. The illustrated components of the program module 310, according to the embodiments, may be termed differently depending on the OS.

According to various exemplary embodiments, at least part of the program module 310 may be implemented in software, firmware, hardware, or combinations of at least two or more thereof. At least part of the program module 310 may be implemented (for example, run) by, for example, a processor (for example, the processor 210). At least part of the program module 310 may include, for example, a module, a program, a routine, sets of instructions, or a process to perform one or more functions.

Figure 4A:
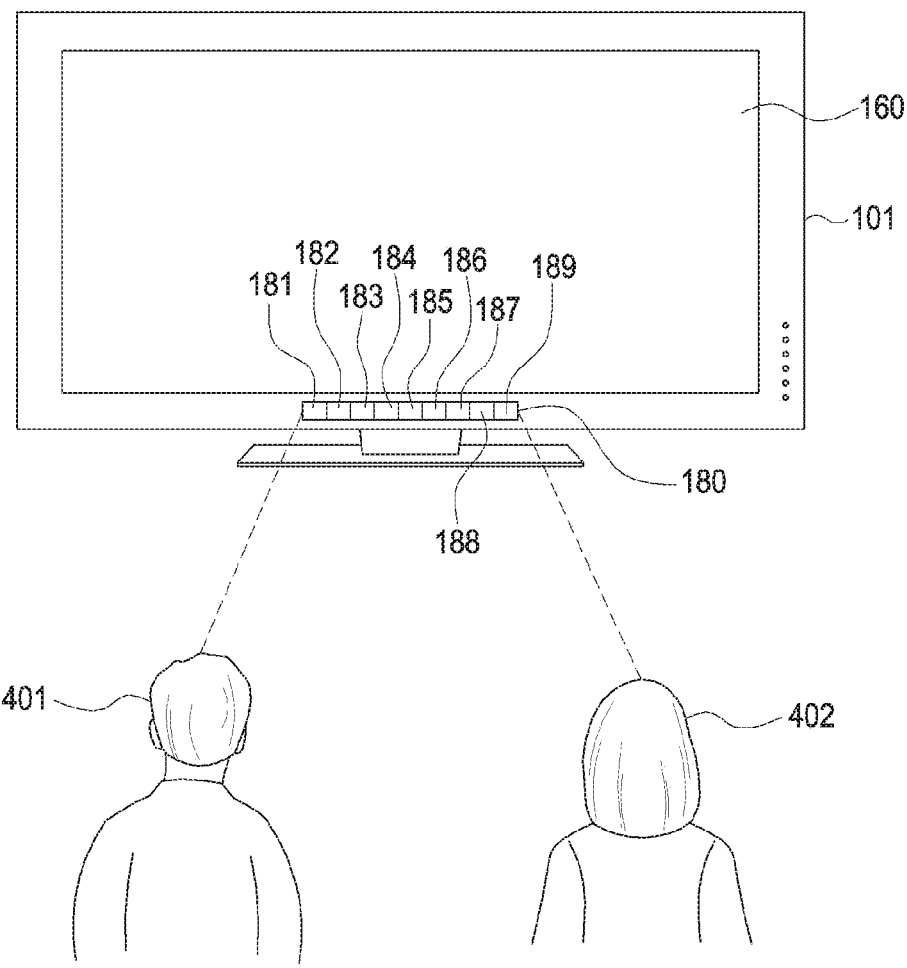
FIGS. 4A and 4B are the conceptual diagrams of an electronic device according to various embodiments of the present disclosure.
Figure 4B:
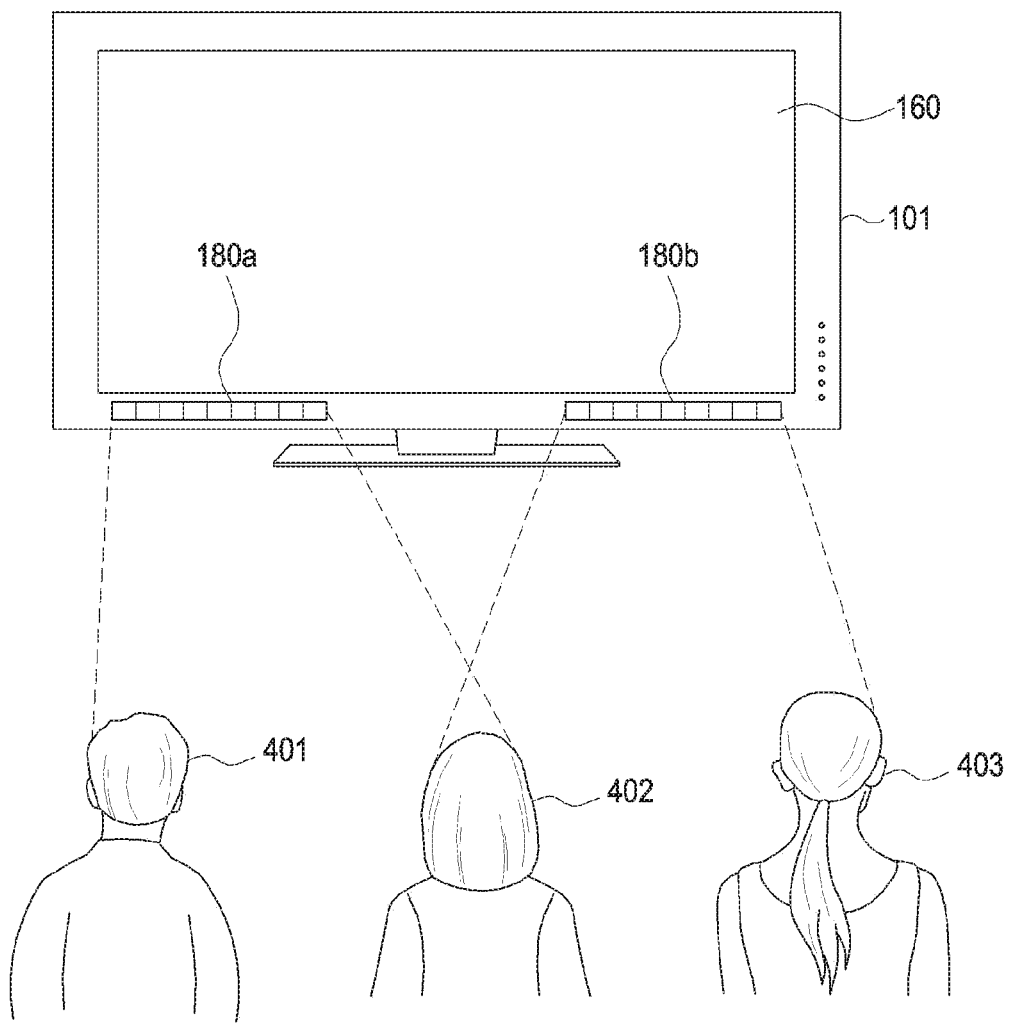

FIGS. 4A and 4B are the conceptual diagrams of an electronic device according to various embodiments of the present disclosure. The electronic device 101 of FIGS. 4A and 4B may be configured in the form of a TV, but those skilled in the art would readily understand that there is no restriction on the configuration of the electronic device. The electronic device 101 may include a display 160 and a sensor 180. The sensor 180 may be configured as an array including 1×N (N is a natural number) pixels 181 to 187. Accordingly, the sensor 180 may obtain a one-dimensional image. A normal camera module may have A×B pixels. Here, A may be the number of pixels in the horizontal axis direction, B may be the number of pixels in the vertical axis direction, and A and B may be natural numbers The normal camera module may obtain a two-dimensional image of the external environment using sensing information output from each of the A×B pixels. In contrast, the sensor 180 according to various embodiments of the present disclosure includes a one-dimensional pixel array having one pixel either in the horizontal axis direction or in the vertical axis direction and thus may obtain a one-dimensional image of the external environment. A one-dimensional image obtained according to various embodiments of the present disclosure may have a significantly smaller amount of information than that of a two-dimensional image and thus may requires a reduced amount of computation. Particularly, since a one-dimensional image has a limited amount of information, using a one-dimensional image makes it possible to prevent an invasion of privacy. A one-dimensional image is merely one line of a two-dimensional image. Thus, even though a one-dimensional image is exposed, a user's privacy is less likely to be exposed.

In various embodiments of the present disclosure, the sensor 180 may include a linear CCD or a linear CMOS device. A linear CCD or linear CMOS has an extra-small thin and long shape and can be installed in a very thin space. Further, the linear CCD or linear CMOS consumes low power and is relatively inexpensive compared to a camera. In addition, the linear CCD or linear CMOS does not provide simple information, such as the presence or absence of an object or distance, like a light level sensor or an ultrasonic sensor, but may analyze input information in real time to detect a movement of a user.

The sensor 180 according to various embodiments of the present disclosure may photograph users 401 and 402 to obtain a one-dimensional image. For example, each of the pixels 181 to 187 of the sensor 180 may convert incident light into an electrical signal and may output the electrical signal, in which the characteristics (for example, voltage, current, or power) of the electrical signal may be associated with the amount of the incident light. Accordingly, the sensor 180 may obtain luminance information corresponding to each of the pixels 181 to 187 to obtain a one-dimensional image. That is, the one-dimensional image may include the luminance information. In various embodiments of the present disclosure, information reflected in the one-dimensional image is not limited to the luminance information but includes any type of information without restriction. The electronic device 101 may analyze the one-dimensional image including the obtained luminance information and may obtain position information on the users 401 and 402. For example, the electronic device 101 may obtain user position information including at least one of the position of the users 401 and 402, the distance from the users 401 and 402 to the electronic device 101, and motion information on the users 401 and 402. When determining the position of the users 401 and 402, the electronic device 101 may also determine the number of users 401 and 402.

In various embodiments of the present disclosure, the electronic device 101 may perform an operation corresponding to the position information on the users 401 and 402. For example, when the electronic device 101 is configured as a TV, the electronic device 101 may adjust the orientation of the display 160 or may adjust the curvature of the display 160 according to the position information on the users 401 and 402, which will be described in detail later.

The sensor 180 includes the one-dimensional pixel array and thus may be configured in a relatively thin and long form. Accordingly, the sensor 180 may be easily disposed in a bezel of the electronic device 101 or the like.

In the embodiment of FIG. 4B, the electronic device 101 may include a plurality of sensors 180a and 180b. Specifically, each of the sensors 180a and 180b may be configured as an array having 1×N pixels (N is a natural number). The number of sensors of each of the sensors 180a and 180b may be the same or may be different. The distance between the sensors 180a and 180b may be determined depending on the photographing angle of each of the sensors 180a and 180b but is not limited thereto. The electronic device 101 may determine position information on users 401, 402, and 403 using a one-dimensional image obtained from each of the plurality of sensors 180a and 180b. In particular, the electronic device 101 may determine information on the distance from the users 401, 402, and 403 to the electronic device 101 by comparing one-dimensional images obtained respectively from the plurality of sensors 180a and 180b. In the present document, a sensor may be configured in the form of a pixel array and thus may be referred to as a sensor array.

As described above, the electronic device 101 according to various embodiments of the present disclosure may obtain and analyze a one-dimensional image, thereby determining position information on a user. As the electronic device 101 uses a one-dimensional image, it is possible to reduce the amount of computation and to prevent an invasion of privacy. In particular, a sensor for obtaining a one-dimensional image can be configured as an array of pixels arranged in one dimension and thus can be disposed in a relatively narrow space, which may advantageous for weight reduction and miniaturization of an electronic device.

Figure 5:
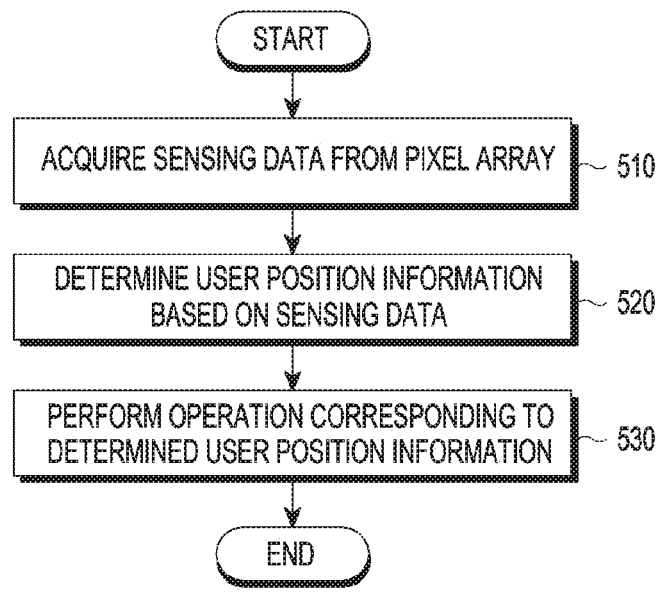
FIG. 5 is a flowchart illustrating a method for controlling an electronic device according to various embodiments of the present disclosure.

FIG. 5 is a flowchart illustrating a method for controlling an electronic device according to various embodiments of the present disclosure.

In operation 510, an electronic device 101 may obtain sensing data from a pixel array. In various embodiments of the present disclosure, the sensing data may be an electrical signal or a characteristic (for example, voltage, current, or power) of an electrical signal related to the amount of light incident on each pixel. Alternatively, the sensing data may be converted information, such as luminance, obtained by converting an electrical signal.

In operation 520, the electronic device 101 may determine user position information on the basis of the sensing data. The electronic device 101 may determine user position information on the basis of sensing data from each pixel of the one-dimensional array. For example, the electronic device 101 may obtain a one-dimensional image using the sensing data from each pixel of the one-dimensional array. The electronic device 101 may divide the one-dimensional image into a region corresponding to a user from a region corresponding to a background and may determine the position of the region corresponding to the user.

In operation 530, the electronic device 101 may perform an operation corresponding to the determined user position information. For example, the electronic device 101 may store in advance information on a relationship between the position of the region corresponding to the user and the operation. Alternatively, the electronic device 101 may store in advance information on a relationship between the position of a pixel corresponding to the user and the operation. Table 1 illustrates relationship information according to various embodiments of the present disclosure.

TABLE 1

| User position | Operation |
| --- | --- |
| (−100) | Rotate the display by −30° relative to the front |
| (0) | Adjust the screen to the front |
| (100) | Rotate the display by 30° relative to the front |

The relationship information according to the embodiment of Table 1 may be relationship information about the rotation of the display of the electronic device 101 according to the user's position. For example, when it is determined that the user is positioned at (−100, 0) as a result of analyzing the sensing data from the sensor, the electronic device 101 may rotate the display by −30 degrees relative to the front. The coordinates in Table 1 may be coordinates in a one-dimensional image or the coordinates of a pixel. In various embodiments of the present disclosure, the electronic device 101 may perform the operation corresponding to the user position information, for example, on the basis of the relationship information illustrated in Table 1. In another embodiment, however, the electronic device 101 may calculate a rotation angle using the user position information and may rotate the display using the calculation result.

Figure 6A:
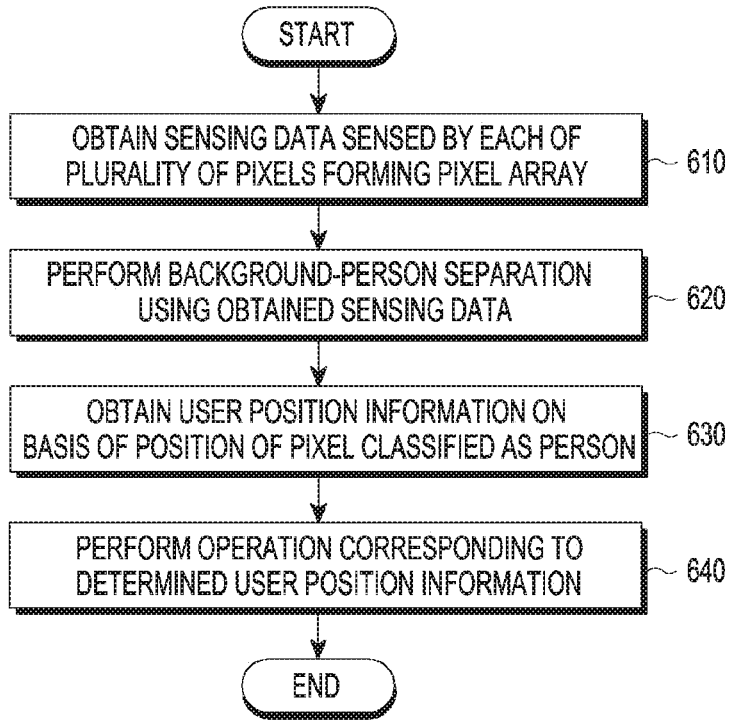
FIGS. 6A to 6C are flowcharts illustrating a method for determining various pieces of user position information according to various embodiments of the present disclosure.
Figure 6B:
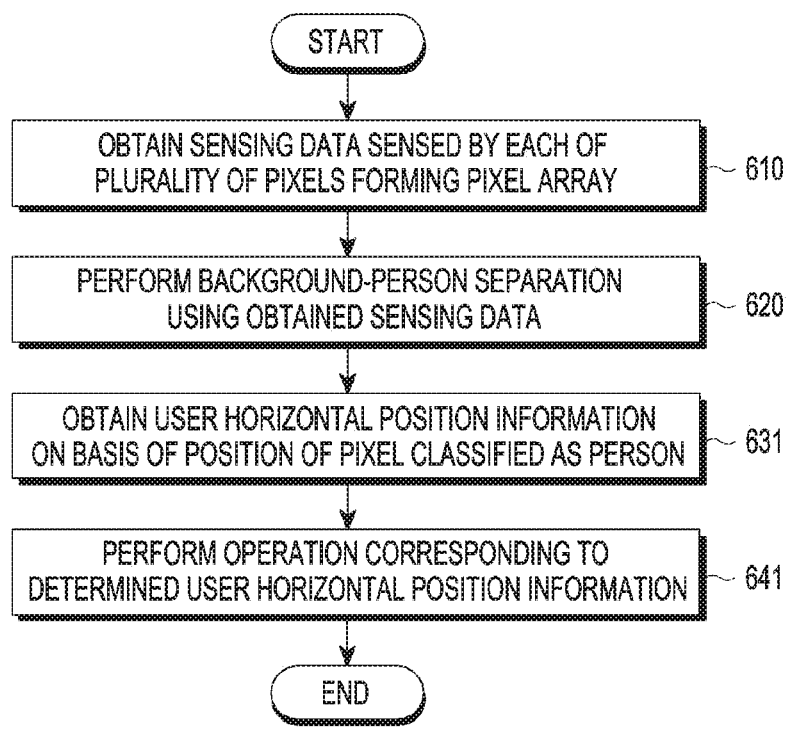
Figure 6C:
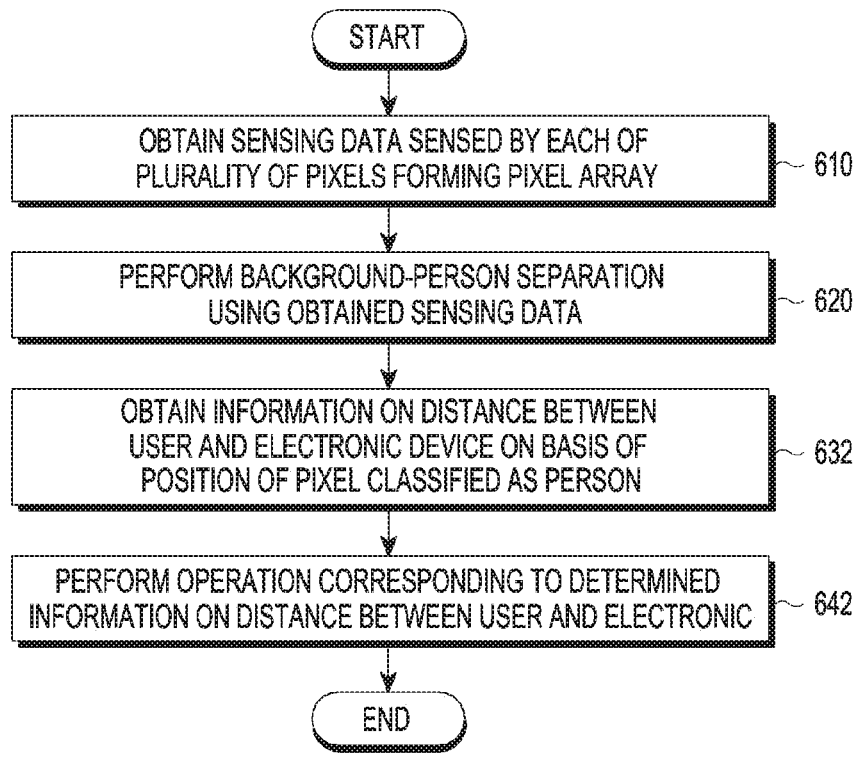

FIGS. 6A to 6C are flowcharts illustrating a method for determining various pieces of user position information according to various embodiments of the present disclosure.

Referring to FIG. 6A, in operation 610, an electronic device 101 may obtain sensing data sensed by each of a plurality of pixels forming a sensor, for example, a pixel array.

In operation 620, the electronic device 101 may perform background-person separation using the obtained sensing data. As described above, the electronic device 101 may obtain a one-dimensional image and may divide the one-dimensional image into a region corresponding to a background and a region corresponding to a person. In various embodiments of the present disclosure, the electronic device 101 may determine a feature point in the one-dimensional image and may separate the region corresponding to the background and the region corresponding to the person using the determined feature. In one embodiment, the electronic device 101 may determine, as a feature point (for example, an edge), a pixel having a numerical value (for example, luminance) of sensing data that is different by greater than a predetermined threshold value from that of a neighboring pixel. The electronic device 101 may determine, as a boundary point, the pixel determined as the feature point, may determine a region on one side of the boundary point as the region corresponding to the background, and may determine a region on the other side of the boundary point as the region corresponding to the person. There is no restriction on a method for the electronic device 101 to perform background-person separation using sensing data. For example, the electronic device 101 may perform background-person separation using various image processing techniques, such as a Support Vector Machine (SVM) technique.

In operation 630, the electronic device 101 may obtain user position information on the basis of the position of a pixel classified as a person. In operation 640, the electronic device 101 may perform an operation corresponding to the determined user position information.

Figure 7A:
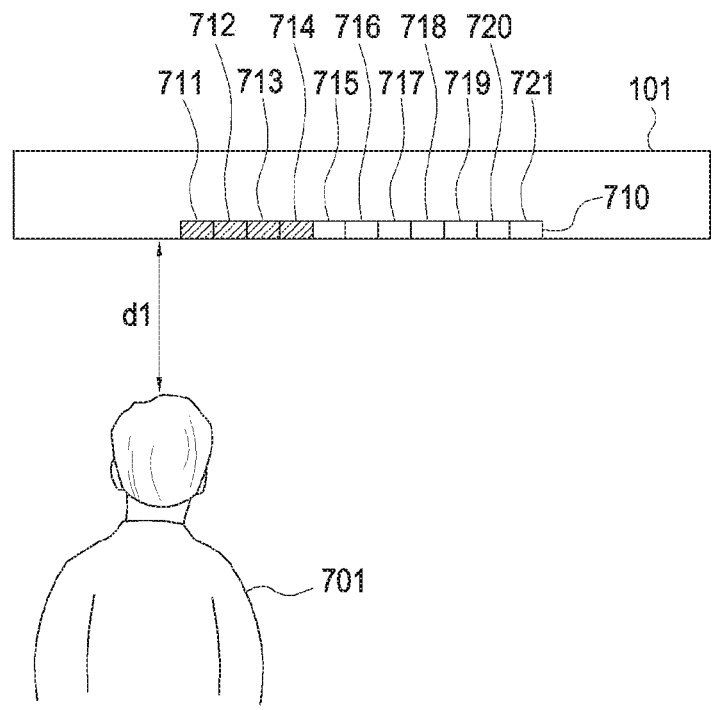
FIGS. 7A and 7B are conceptual diagrams illustrating a method for determining the horizontal position of a user according to various embodiments of the present disclosure.
Figure 7B:
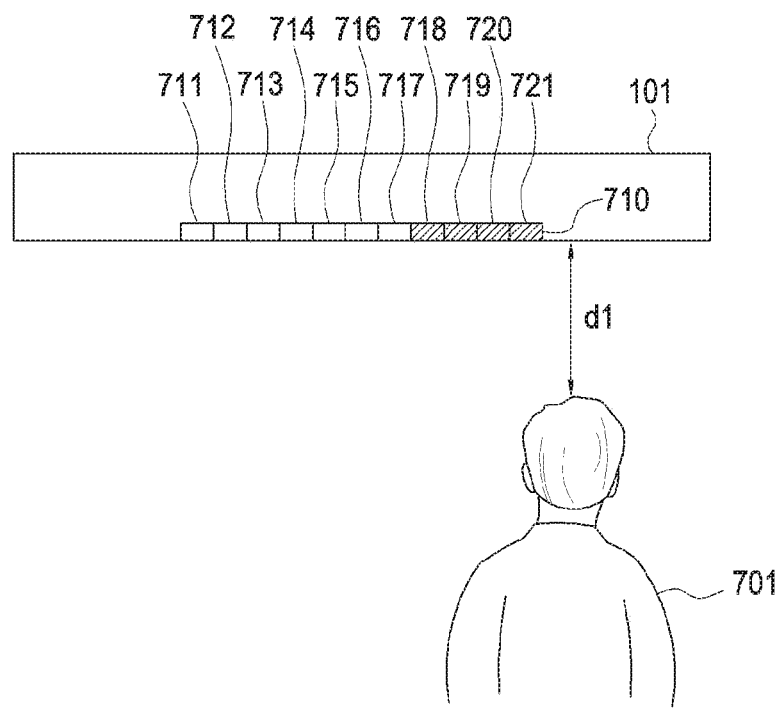

FIG. 6B is a flowchart illustrating a method for determining the horizontal position of a user according to various embodiments of the present disclosure. The embodiment of FIG. 6B will be described in detail with reference to FIGS. 7A and 7B. FIGS. 7A and 7B are conceptual diagrams illustrating a method for determining the horizontal position of a user according to various embodiments of the present disclosure.

Operations 610 and 620 in FIG. 6B have been described above with reference to FIG. 6A, and thus a detailed description thereof is omitted herein.

In operation 631, the electronic device 101 may obtain horizontal position information on a user on the basis of the position of a pixel classified as a person. For example, as illustrated in FIG. 7A, a user 701 may be positioned relatively on the left side relative to the center of gravity of the electronic device 101. In this case, the electronic device 101 may obtain sensing data from a sensor 710 including a plurality of pixels 711 to 721. The electronic device 101 may analyze the sensing data and may separate regions 711 to 714 classified as a person and regions 715 to 721 classified as a background. As the user 701 is positioned relatively on the left side, the user 701 may be photographed at the pixels 711 to 714 disposed relatively on the left side of the sensor. That is, the electronic device 101 may obtain a one-dimensional image with the user 701 positioned relatively on the left side. The electronic device 101 may determine the horizontal position of the user 701 in the one-dimensional image.

Referring to FIG. 7B, the user 701 may be positioned relatively on the right side relative to the center of gravity of the electronic device 101. In this case, the electronic device 101 may obtain sensing data from the sensor 710 including the plurality of pixels 711 to 721. The electronic device 101 may analyze the sensing data and may separate regions 718 to 721 classified as a person and regions 711 to 717 classified as a background. As the user 701 is positioned relatively on the right side, the user 701 may be photographed at the pixels 718 to 721 disposed relatively on the right side of the sensor. That is, the electronic device 101 may obtain a one-dimensional image with the user 701 positioned relatively on the right side. The electronic device 101 may determine the horizontal position of the user 701 in the one-dimensional image.

In operation 641, the electronic device 101 may perform an operation corresponding to the determined horizontal position information on the user 701. For example, when the electronic device 101 determines that the user 701 is positioned relatively on the left side, the electronic device 101 may rotate the display to the left so that the user 701 positioned on the left side can look straightly at the display.

Although it has been illustrated that the electronic device 101 determines the horizontal position information on the user 701, the foregoing embodiment is merely an example. In various embodiments of the present disclosure, the electronic device 101 may include a sensor that includes a pixel array in a vertical direction, in which case the electronic device 101 may determine vertical position information on the user 701.

Figure 7C:
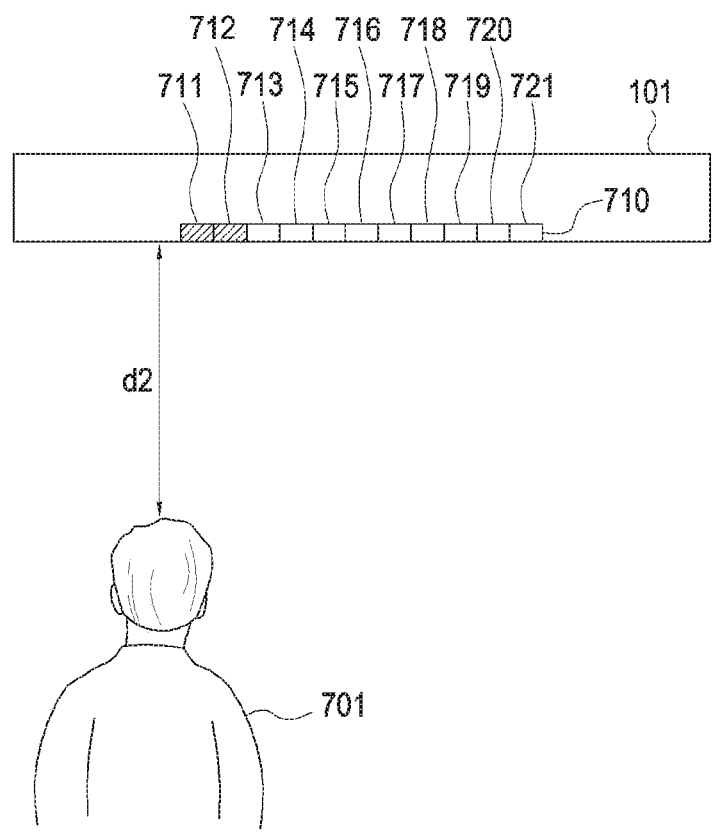
FIG. 7C is a conceptual diagram illustrating a method for determining the distance between a user and an electronic device according to various embodiments of the present disclosure.

FIG. 6C is a flowchart illustrating a method for determining the horizontal position of a user according to various embodiments of the present disclosure. The embodiment of FIG. 6C will be described in detail with reference to FIGS. 7A and 7C. FIGS. 7A and 7C are conceptual diagrams illustrating a method for determining the horizontal position of a user according to various embodiments of the present disclosure.

Operations 610 and 620 in FIG. 6C have been described above with reference to FIG. 6A, and thus a detailed description thereof is omitted herein.

In operation 632, the electronic device 101 may obtain information on the distance between a user and the electronic device on the basis of the position of a pixel classified as a person. For example, referring to FIG. 7A, the user 701 may be positioned a distance of d1 from the surface of the electronic device 101. In this case, the electronic device 101 may obtain sensing data from the sensor 710 including the plurality of pixels 711 to 721. The electronic device 101 may analyze the sensing data and may separate regions 711 to 714 classified as a person and regions 715 to 721 classified as a background. As the distance between the user and the electronic device is d1, the user 701 may be photographed at a relatively large number of pixels 711 to 714. That is, the electronic device 101 may obtain a one-dimensional image in which the user 701 is photographed as a relatively large image. The electronic device 101 may determine the information on the distance between the user and the electronic device on the basis of the size of the user 701 or the number of regions 711 to 714 classified as a person.

For example, referring to FIG. 7C, the user 701 may be positioned a distance of d2 from the surface of the electronic device 101. In this case, the electronic device 101 may obtain sensing data from the sensor 710 including the plurality of pixels 711 to 721. The electronic device 101 may analyze the sensing data and may separate regions 711 and 712 classified as a person and regions 713 to 721 classified as a background. As the distance between the user and the electronic device is d2, the user 701 may be photographed at a relatively small number of pixels 711 and 712. That is, the electronic device 101 may obtain a one-dimensional image in which the user 701 is photographed as a relatively small image. The electronic device 101 may determine the information on the distance between the user and the electronic device on the basis of the size of the user 701 or the number of regions 711 to 712 classified as a person.

The greater the distance between the user and the electronic device is, the smaller the size of the user 701 in the one-dimensional image or the number of regions 711 and 712 classified as a person may be, while the smaller the distance between the user and the electronic device is, the greater the size of the user 701 in the one-dimensional image or the number of regions 711 to 714 classified as a person may be.

The electronic device 101 may store in advance information on a relationship between the size of a user in a one-dimensional image or the number of pixels corresponding to the user and the distance between the user and the electronic device. For example, the electronic device 101 may store relationship information illustrated in Table 2.

TABLE 2

| Number of pixels corresponding to user | Distance between user and electronic device |
|---|---|
| a1 | d1 |
| a2 | d2 |
| a3 | d3 |

The electronic device 101 may determine the distance between the user and the electronic device using the relationship information illustrated in Table 2.

In operation 642, the electronic device 101 may perform an operation corresponding to the determined information on the distance between the user and the electronic device. For example, the electronic device 101 may adjust the curvature of the display according to the information on the distance.

As described above, the electronic device 101 may determine various types of user position information, such as the horizontal position information on the user or the information on the distance between the user and the electronic device, using sensing data from one sensor including a pixel array.

In various embodiments of the present disclosure, each pixel of a pixel array may also be configured with a phase pixel, such as a photodiode (2PD). Specifically, one pixel of the pixel array may include two sub-pixels, and the amounts of light detected by the two sub-pixels may be different. The electronic device 101 may determine the distance between the user and the electronic device 101 on the basis of the difference between sensing data sensed by one sub-pixel and sensing data sensed by the other sub-pixel. The electronic device 101 may determine the horizontal position information on the user and the information on the distance between the user and the electronic device 101 using sensing data from the pixel array including the phase pixel.

Figure 8:
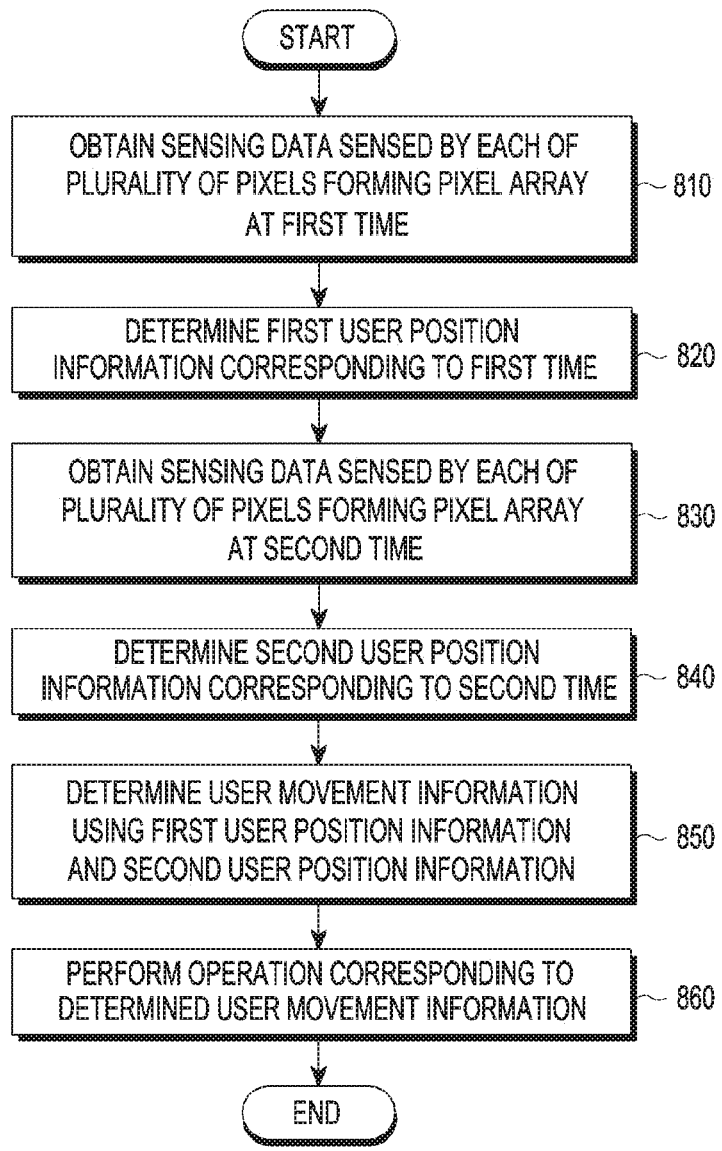
FIG. 8 is a flowchart illustrating a method for controlling an electronic device according to various embodiments of the present disclosure.

FIG. 8 is a flowchart illustrating a method for controlling an electronic device according to various embodiments of the present disclosure. The embodiment of FIG. 8 will be described in detail with reference to FIGS. 9A to 9H. FIGS. 9A to 9H are conceptual diagrams illustrating a result of person-background separation by a pixel array according to various embodiments of the present disclosure.

In operation 810, an electronic device 101 may obtain sensing data sensed by each of a plurality of pixels forming a pixel array at a first time. In operation 820, the electronic device 101 may determine first user position information corresponding to the first time. In operation 830, the electronic device 101 may obtain sensing data sensed by each of the plurality of pixels forming the pixel array at a second time. In operation 840, the electronic device 101 may determine second user position information corresponding to the second time. That is, the electronic device 101 may obtain a plurality of one-dimensional images over time.

In operation 850, the electronic device 101 may determine user movement information using the first user position information and the second user position information. In operation 860, the electronic device 101 may perform an operation corresponding to the determined user movement information.

Figure 9A:
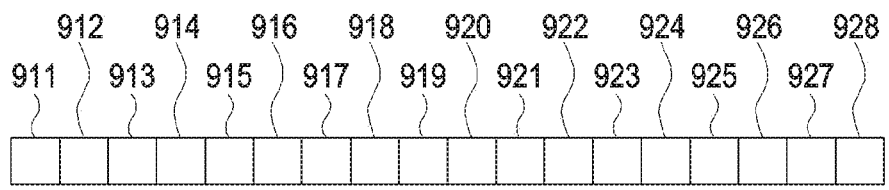
FIGS. 9A to 9H are conceptual diagrams illustrating a result of person-background separation by a pixel array according to various embodiments of the present disclosure.
Figure 9B:
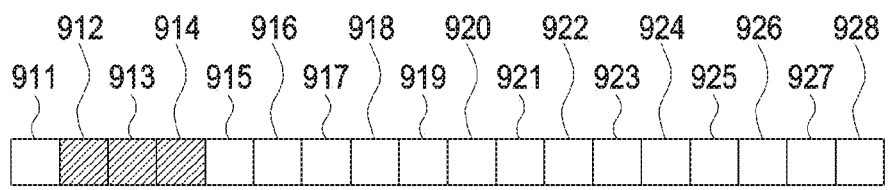
Figure 9C:
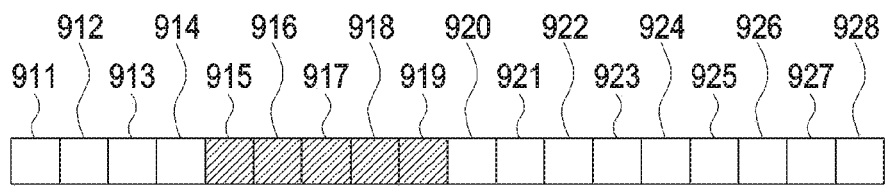
Figure 9D:
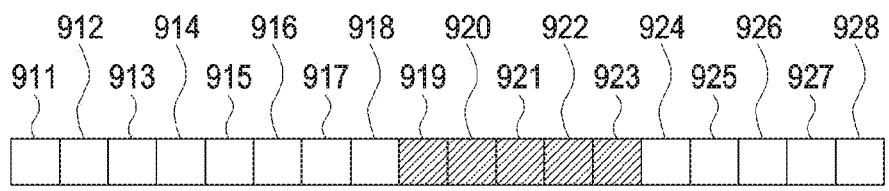

For example, the electronic device 101 may perform person-background separation using sensing data from a sensor including a plurality of pixels 911 to 928 at a first time. Referring to FIG. 9A, the electronic device 101 may separate all of the pixels 911 to 928 as the background at the first time. The electronic device 101 may perform person-background separation using sensing data from the sensor including the plurality of pixels 911 to 928 at a second time. Referring to FIG. 9B, the electronic device 101 may separate pixels 912 to 914 as a person region and may separate the remaining pixels 911 and 915 to 928 as a background region at the second time. The electronic device 101 may perform person-background separation using sensing data from the sensor including the plurality of pixels 911 to 928 at a third time. Referring to FIG. 9C, the electronic device 101 may separate pixels 916 to 919 as a person region and may separate the remaining pixels 911 to 915 and 920 to 928 as a background region at the third time. The electronic device 101 may perform person-background separation using sensing data from the sensor including the plurality of pixels 911 to 928 at a fourth time. Referring to FIG. 9D, the electronic device 101 may separate pixels 919 to 923 as a person region and may separate the remaining pixels 911 to 918 and 924 to 928 as a background region at the fourth time. That is, the electronic device 101 may determine that the person region, that is, the position of a user, is moved relatively to the right over time, and may determine that user movement information is a rightward movement. The electronic device 101 may perform an operation corresponding to rightward movement information. For example, the electronic device 101 may rotate a display in response to the user's position in real time. In various embodiments of the present disclosure, the electronic device 101 may obtain information on the user's moving speed by dividing the user movement information by the time spent. As described above, the electronic device 101 according to various embodiments of the present disclosure may determine information on a horizontal or vertical movement of the user.

Figure 9E:
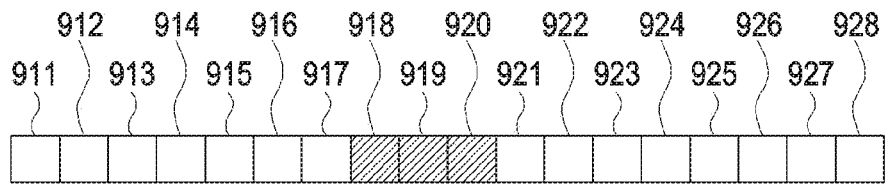
Figure 9F:
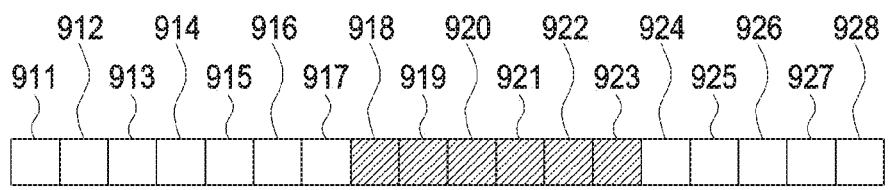
Figure 9G:
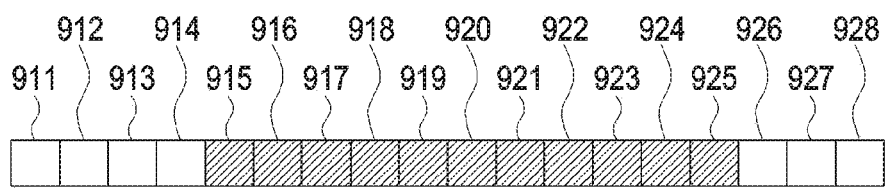
Figure 9H:
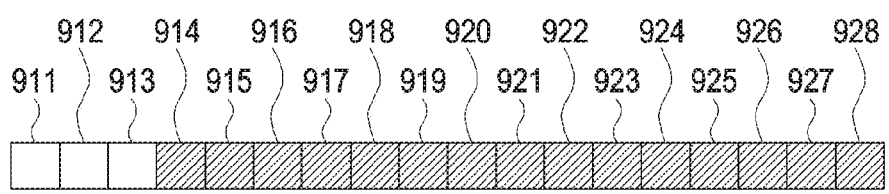

The electronic device 101 may determine information on a movement of the user in a direction between the user and the electronic device. Referring to FIG. 9E, the electronic device 101 may separate pixels 918 to 921 as a person region and may separate the remaining pixels 911 to 917 and 922 to 928 as a background region at a first time. The electronic device 101 may perform person-background separation using sensing data from the sensor including the plurality of pixels 911 to 928 at a second time. Referring to FIG. 9F, the electronic device 101 may separate pixels 918 to 923 as a person region and may separate the remaining pixels 911 to 917 and 924 to 928 as a background region at the second time. The electronic device 101 may perform person-background separation using sensing data from the sensor including the plurality of pixels 911 to 928 at a third time. Referring to FIG. 9G, the electronic device 101 may separate pixels 915 to 925 as a person region and may separate the remaining pixels 911 to 914 and 926 to 928 as a background region at the third time. The electronic device 101 may perform person-background separation using sensing data from the sensor including the plurality of pixels 911 to 928 at a fourth time. Referring to FIG. 9H, the electronic device 101 may separate pixels 914 to 928 as a person region and may separate the remaining pixels 911 to 913 as a background region at the fourth time. That is, the electronic device 101 may determine that a relatively large number of pixels correspond to the user relating to the person region, that is, the position of the user, over time. The electronic device 101 may determine user movement information indicating that the user approaches the electronic device 101 over time. The electronic device 101 may perform an operation corresponding to the movement information of the approach. For example, the electronic device 101 may adjust the curvature of the display in response to the user's approach in real time. In various embodiments of the present disclosure, the electronic device 101 may obtain information on the user's moving speed by dividing the user movement information by the time spent.

Figure 10:
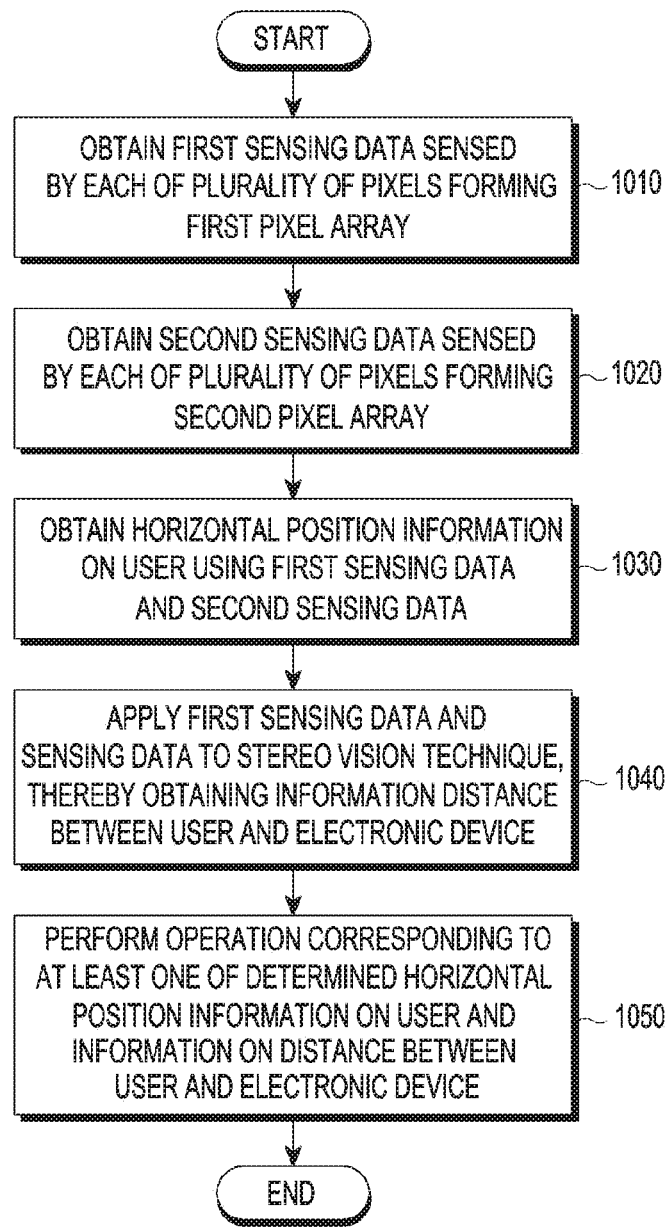
FIG. 10 is a flowchart illustrating a method for controlling an electronic device including a plurality of pixel arrays according to various embodiments of the present disclosure.
Figure 11A:
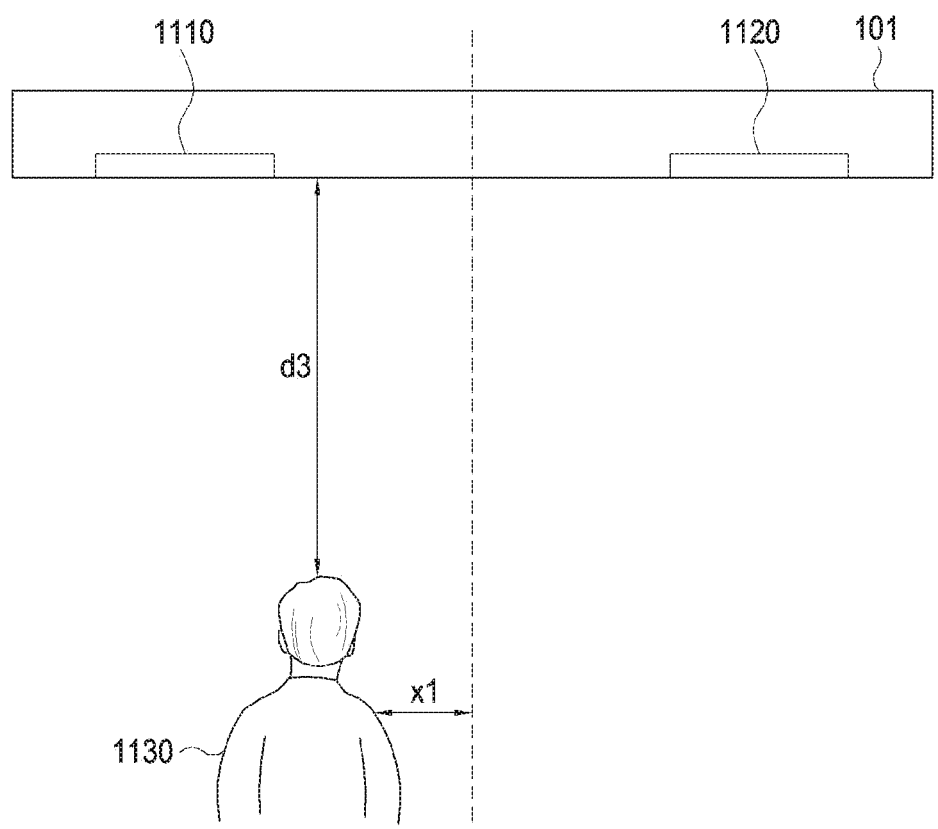
FIGS. 11A and 11B are conceptual diagrams illustrating the operation of an electronic device including a plurality of pixel arrays according to various embodiments of the present disclosure.
Figure 11B:
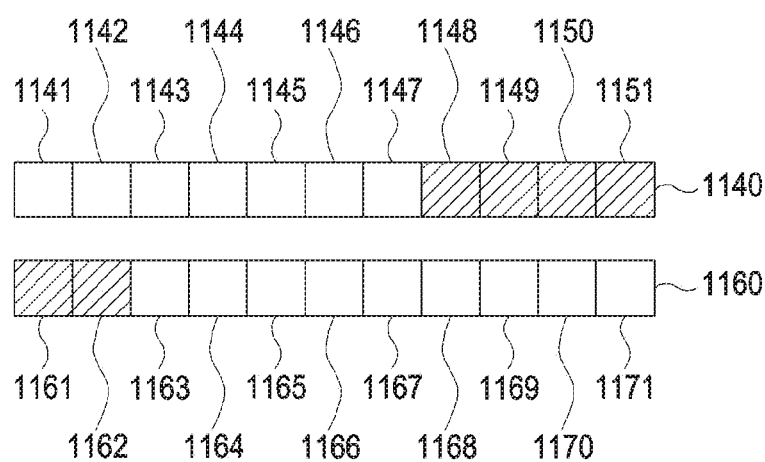

FIG. 10 is a flowchart illustrating a method for controlling an electronic device including a plurality of pixel arrays according to various embodiments of the present disclosure. The embodiment of FIG. 10 will be described in detail with reference to FIGS. 11A and 11B. FIGS. 11A and 11B are conceptual diagrams illustrating the operation of an electronic device including a plurality of pixel arrays according to various embodiments of the present disclosure.

In operation 1010, the electronic device 101 may obtain first sensing data sensed at each of a plurality of pixels forming a first pixel array. For example, referring to FIG. 11A, the electronic device 101 may include a first pixel array 1110 and a second pixel array 1120. The first pixel array 1110 may include a plurality of pixels arranged in one dimension, and the second pixel array 1120 may include a plurality of pixels arranged in one dimension. The first pixel array 1110 and the second pixel array 1120 may be disposed in order to thoroughly take images in a particular direction of the electronic device 101. For example, the distance between the first pixel array 1110 and the second pixel array 1120 may be set in view of the photographing angle of each of the first pixel array 1110 and the second pixel array 1120. In the embodiment of FIG. 11A, it is assumed that a user 1130 is spaced D3 from the surface of the electronic device 101 and is spaced X1 leftward from an axis passing through the center of gravity of the electronic device 101. The electronic device 101 may obtain first sensing data 1140 illustrated in FIG. 11B. Although the first sensing data 1140 illustrated in FIG. 11B is a result of person-background separation, those skilled in the art would readily understand that the electronic device 101 can obtain the first sensing data 1140 by first obtaining raw data, such as luminance or electrical characteristics, from each of the pixels 1141 to 1151 of the first array 1110 and applying person-background separation to the raw data.

In operation 1020, the electronic device 101 may obtain second sensing data sensed at each of a plurality of pixels forming a second pixel array. The electronic device 101 may obtain, for example, second sensing data 1160 illustrated in FIG. 11B. Although the second sensing data 1160 illustrated in FIG. 11B is a result of person-background separation, those skilled in the art would readily understand that the electronic device 101 can obtain the second sensing data 1160 by first obtaining raw data, such as luminance or electrical characteristics, from each of the pixels 1161 to 1171 of the second array 1120 and applying person-background separation to the raw data.

In operation 1030, the electronic device 101 may obtain horizontal position information on a user using the first sensing data and the second sensing data. For example, the electronic device 101 may divide the first sensing data 1140 illustrated in FIG. 11B into pixels 1141 to 1147 as a background region and pixels 1148 to 1151 as a person region. The electronic device 101 may divide the second sensing data 1160 illustrated in FIG. 11B into pixels 1163 to 1171 as a background region and pixels 1161 and 1162 as a person region. The electronic device 101 may determine the position of the user 1130 relative to the first pixel array 1110 and determine the position of the user 1130 relative to the second pixel array 1120. The electronic device 101 according to various embodiments of the present disclosure may determine the position of the user 1130, for example, relative to an axis passing through the center of gravity, using the position of the user 1130 relative to the first pixel array 1110 and the position of the user 1130 relative to the second pixel array 1120. In another embodiment, the electronic device 101 may determine the position of the user 1130 relative to an axis passing through the center of gravity directly using the first sensing data and the second sensing data.

In operation 1040, the electronic device 101 may apply the first sensing data and the second sensing data to a stereo vision technique, thereby obtaining information the distance between the user and the electronic device. Referring to FIG. 11A, since the first pixel array 1110 and the second pixel array 1120 are disposed at different positions in the electronic device 101, the relative position of the user 1130 with respect to the second pixel array 1120 may be different from the relative position of the user 1130 with respect to the second pixel array 1120. Accordingly, as illustrated in FIG. 11B, the first sensing data 1140 sensed from the first pixel array 1110 may be different from the second sensing data 1160 sensed from the second pixel array 1120. In various embodiments of the present disclosure, the electronic device 101 may compare the first sensing data 1140 with the second sensing data 1160 and may determine that the distance from the user 1130 to the electronic device 101 is D3 on the basis of the comparison result. The electronic device 101 may determine the distance between the user 1130 and the electronic device 101 using various image analysis techniques including an image analysis technique for analyzing distance using a plurality of images captured by a plurality of cameras corresponding to both eyes, for example, a stereo vision technique, but there is no restriction on image analysis techniques used for distance analysis.

In operation 1050, the electronic device 101 may perform an operation corresponding to at least one of the determined horizontal position information on the user and the information on the distance between the user and the electronic device.

As described above, the electronic device 101 according to various embodiments of the present disclosure may determine more accurate user position information using sensing data from a plurality of pixel arrays.

Figure 12:
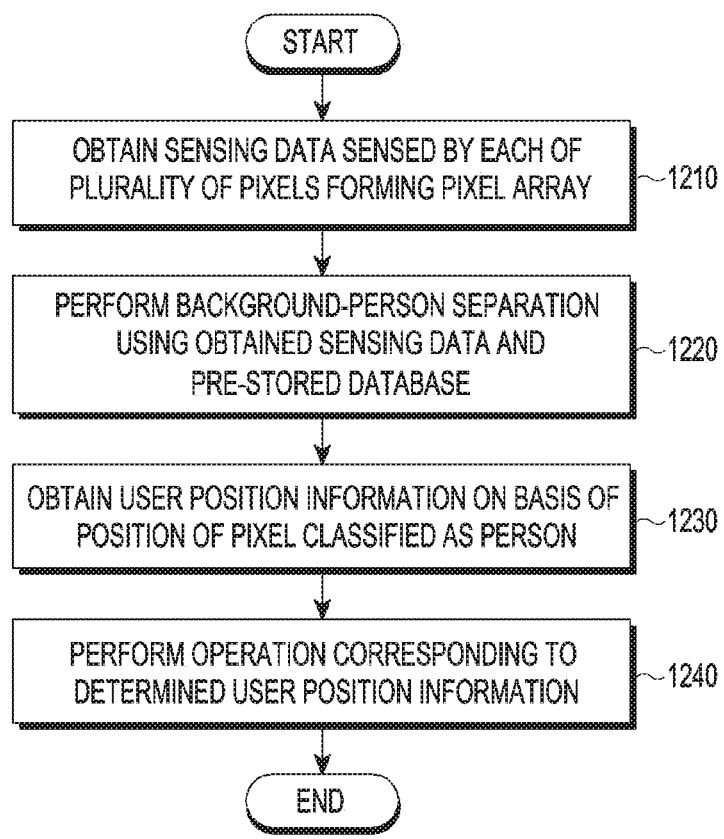
FIG. 12 is a flowchart illustrating a method for controlling an electronic device using a database according to various embodiments of the present disclosure.

FIG. 12 is a flowchart illustrating a method for controlling an electronic device using a database according to various embodiments of the present disclosure. The embodiment of FIG. 12 will be described in detail with reference to FIGS. 13A to 13D. FIGS. 13A to 13D are conceptual diagrams illustrating that an electronic device determines user position information using a database according to various embodiments of the present disclosure.

In operation 1210, the electronic device 101 may obtain sensing data sensed by each of a plurality of pixels forming a pixel array. In operation 1220, the electronic device 101 may perform background-person separation using the obtained sensing data and a pre-stored reference database. In operation 1230, the electronic device 101 may obtain user position information on the basis of the position of a pixel classified as a person. In operation 1240, the electronic device 101 may perform an operation corresponding to the determined user position information.

Figures 13A, 13B:
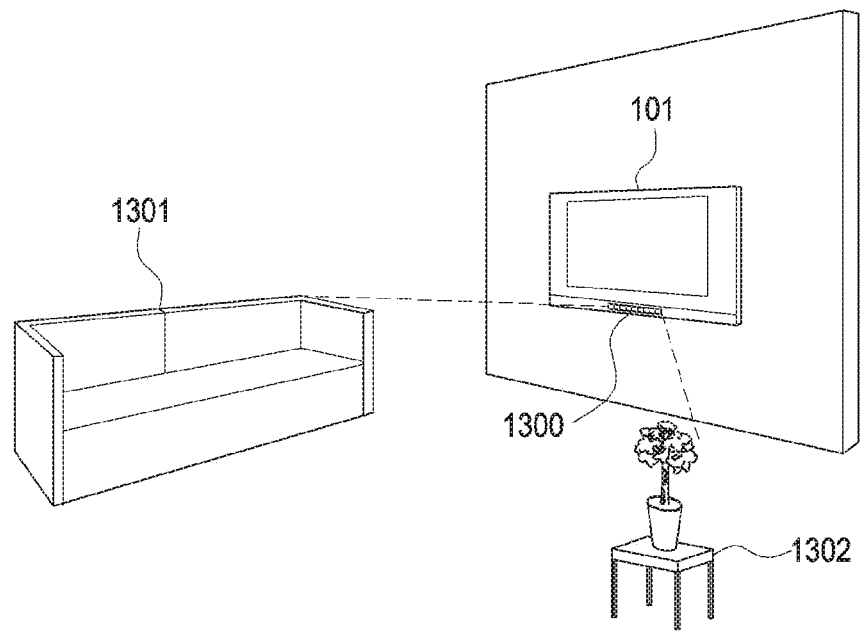
FIGS. 13A to 13D are conceptual diagrams illustrating an electronic device determining user position information using a database according to various embodiments of the present disclosure.

For example, referring to FIG. 13A, the electronic device 101 may include a pixel array 1300. For example, the electronic device 101 may be configured as a TV and may be disposed in a home environment. Other pieces of furniture 1301 and 1302 included in the home environment may be disposed in front of the electronic device 101. For example, a sofa 1301 may be disposed on the relatively front right side of the electronic device 101, and a table 1302 may be disposed on the relatively front left side of the electronic device 101. The electronic device 101 may photograph an environment where there is no user, that is, a usual environment. Specifically, the electronic device 101 may pre-store, as a database, a one-dimensional image obtained by photographing the usual environment using the pixel array 1300.

FIG. 13B illustrates an example of the one-dimensional image 1310 obtained by the electronic device 101 photographing the usual environment. As illustrated in FIG. 13B, the one-dimensional image 1310 may include raw data, for example, a luminance values, for each of pixels 1311 to 1324. The luminance value may be a natural number among values of 0 to 255. As illustrated in FIG. 13B, pixels 1316 to 1318 of the one-dimensional image 1310 may have a relatively smaller value than neighboring pixels, which may result from the sofa 1301 being included in the image. In addition, pixels 1323 and 1324 of the one-dimensional image 1310 may have a relatively smaller value than neighboring pixels, which may result from a table 1302 being included in the image.

Figure 13C:
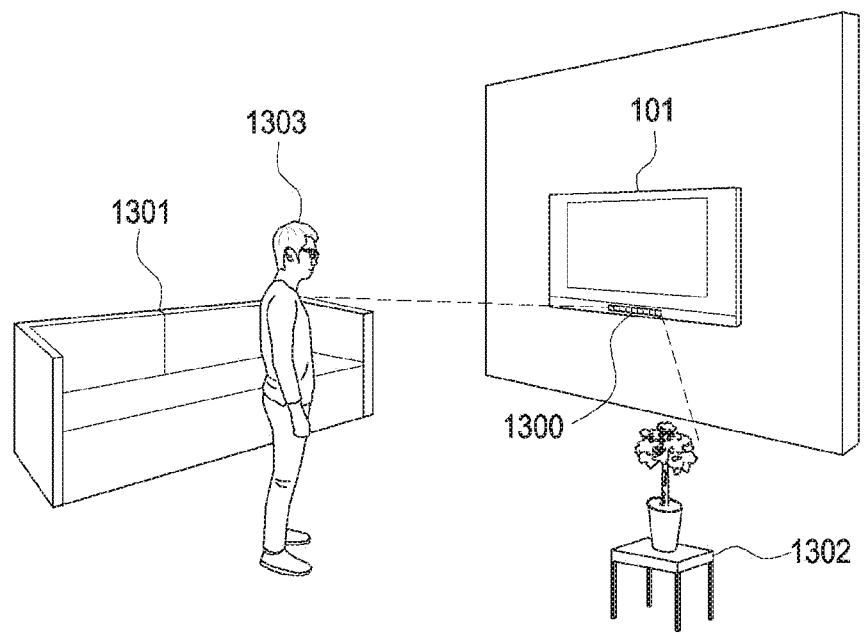
Figure 13D:
Figure 13D:

FIG. 13C is a conceptual diagram assuming that a user 1303 is positioned in front of the electronic device 101. As illustrated in FIG. 13C, the user 1303 may be positioned between the sofa 1301 and the table 1302. In this case, the electronic device 101 may obtain a one-dimensional image 1340 illustrated in FIG. 13D or sensing data using the pixel array 1300. The obtained one-dimensional image 1340 includes pixels 1349 to 1352 respectively having relatively low luminance values of 17, 14, 5, and 9, which may result from the user 1303 being included in the image. Referring to FIG. 13C, as the user 1303 is photographed at the positions of the pixels 1349 to 1352, it may be difficult to distinguish the pixels 1349 to 1352 corresponding to the user 1303 from pixels 1346 to 1348 corresponding to the sofa 1301. As described above, the electronic device 101 according to various embodiments of the present disclosure may separate a person from a background using a feature point as a boundary point in a person-background separation process. However, as illustrated in FIG. 13D, the difference in luminance value between the pixels 1346 to 1348 corresponding to the sofa 1301 and the pixels 1349 to 1352 corresponding to the user 1303 may be relatively small. In this case, the electronic device 101 cannot classify, for example, the pixel 1348 or pixel 1349 as a feature point and thus cannot determine the accurate position of the user 1303.

The electronic device 101 may perform person-background separation on the basis of the result of comparing a previously stored database and the obtained sensing data. For example, as illustrated in FIG. 13D, the electronic device 101 may compare the one-dimensional image 1310 of the pre-stored usual environment with the obtained one-dimensional image 1340. In various embodiments of the present disclosure, the electronic device 101 may obtain a difference image 1360 from the two images 1310 and 1340. The difference image 1360 may be an image including a difference between the pixels of the two images 1310 and 1340 as a value. For example, a pixel 1368 of the difference image 1360 may have a value of 0 that is the difference between the value of the pixel 1318 of the one-dimensional image 1310 in the database, which is 5, and the value of the pixel 1348 of the obtained one-dimensional image 1340, which is 5. A pixel 1369 of the difference image 1360 has a value of 77 that is the difference between the value of the pixel 1319 of the one-dimensional image 1310 in the database, which is 94, and the value of the pixel 1349 of the obtained one-dimensional image 1340, which is 17. A pixel 1370 of the difference image 1360 has a value of 95 that is the difference between the value of the pixel 1320 of the one-dimensional image 1310 in the database, which is 109, and the value of the pixel 1350 of the obtained one-dimensional image 1340, which is 14. A pixel 1371 of the difference image 1360 has a value of 130 that is the difference between the value of the pixel 1321 of the one-dimensional image 1310 in the database, which is 135, and the value of the pixel 1351 of the obtained one-dimensional image 1340, which is 5. A pixel 1372 of the difference image 1360 has a value of 132 that is the difference between the value of the pixel 1322 of the one-dimensional image 1310 in the database, which is 141, and the value of the pixel 1352 of the obtained one-dimensional image 1340, which is 9. A pixel 1373 of the difference image 1360 has a value of 0 that is the difference between the value of the pixel 1323 of the one-dimensional image 1310 in the database, which is 15, and the value of the pixel 1353 of the obtained one-dimensional image 1340, which is 15. Accordingly, the pixel 1369 of the difference image 1360 may have a relatively significant difference from the neighboring pixel 1368, and the pixel 1372 may have a relatively significant difference from the neighboring pixel 1373. The electronic device 101 may classify the pixels 1369 and pixels 1372 of the difference image 1360 as feature points, may classify the pixels 1369 to 1372 as a region corresponding to a person, and may classify the pixels 1361 to 1368, 1373, and 1374 as a region corresponding to a background.

As described above, the electronic device 101 according to the various embodiments of the present disclosure may determine accurate position information on the user using the result of comparing the database, such as the difference image 1360, and the obtained sensing data.

In various embodiments of the present disclosure, the electronic device 101 may monitor a surrounding environment. The electronic device 101 may periodically or aperiodically photograph the surrounding environment using the sensor array 1300 and may store a captured image as a database. That is, the electronic device 101 may update the database and accordingly may accurately determine the position information on the user by referring to changes in the surrounding environment.

Figure 14A:
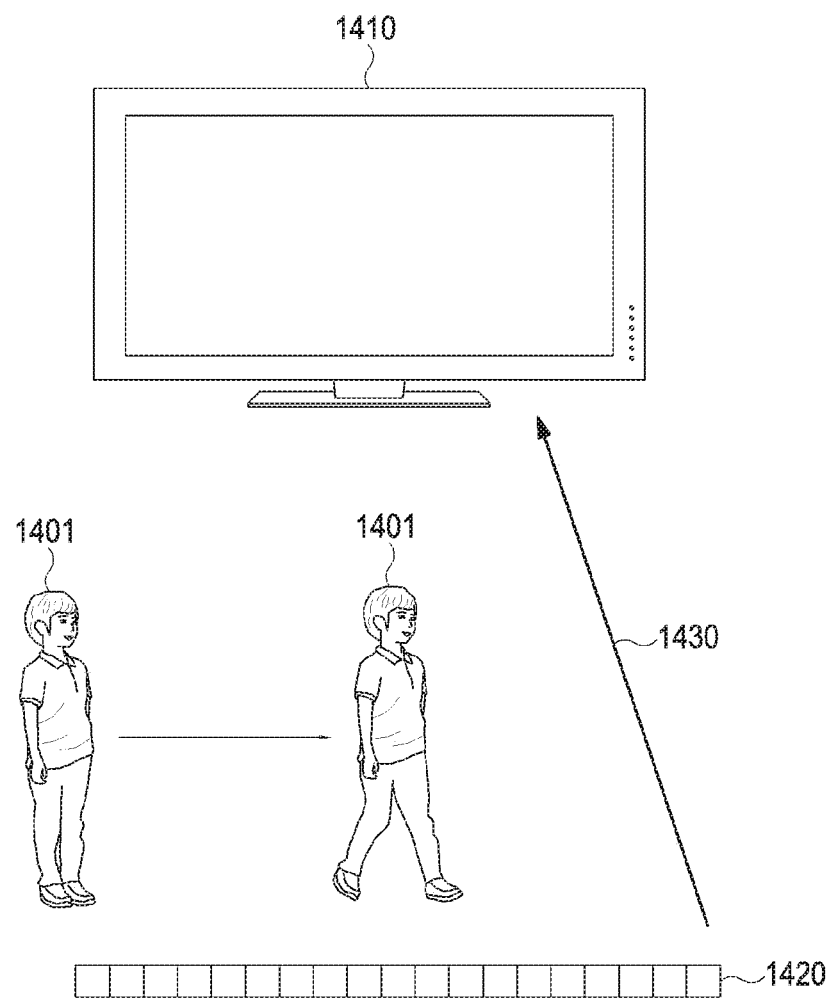
FIGS. 14A and 14B are conceptual diagrams illustrating the arrangement of an electronic device according to various embodiments of the present disclosure.
Figure 14B:
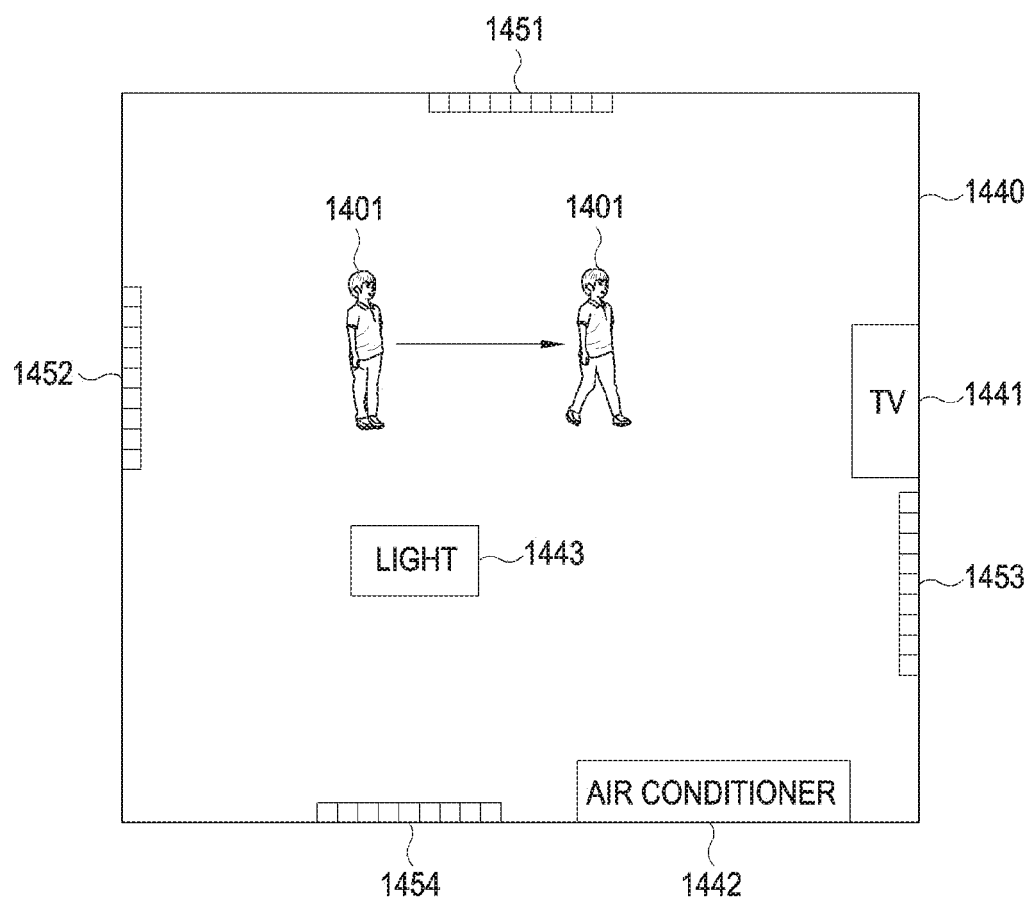

FIGS. 14A and 14B are conceptual diagrams illustrating the arrangement of an electronic device according to various embodiments of the present disclosure.

As illustrated in FIG. 14A, an electronic device 1420 may be configured separately from another electronic device 1410. For example, the electronic device 1420 according to various embodiments of the present disclosure may include only a sensor array including a plurality of sensors and a communication module capable of transmitting data 1430 sensed by the sensor array. In this case, the electronic device 1420 may be driven with low power, including only the sensors configured in a one-dimensional array and the communication modules, and may be advantageous for establishing an Internet of Things (IoT) environment. In this case, the communication module (not shown) of the electronic device 1420 may include a stack for various modes of wireless communication, and there is no restriction on the wireless communication modes.

The electronic device 1420 may transmit the sensing data 1430 sensed by the pixel array to the electronic device 1410.

The electronic device 1410 may determine position information on a user 1401 based on the electronic device 1420 using the received sensing data 1430. The electronic device 1410 may store in advance a positional relationship between the electronic device 1410 and the electronic device 1420 and may determine position information on the user 1401 based on the electronic device 1410 using the positional relationship and the received sensing data 1430. The electronic device 1410 may store in advance information on a relationship the received sensing data 1430 and the position information on the user 1401 based on the electronic device 1410 and may determine the position information on the user 1401 based on the electronic device 1410 using the stored information on the relationship.

FIG. 14B is a conceptual diagram illustrating a home network environment according to various embodiments of the present disclosure.

As illustrated in FIG. 14B, a home network 1440 may include at least one electronic device 1441, 1442, or 1443. In addition, at least one pixel array 1451, 1452, 1453, or 1454 may be disposed in the home network 1440. The at least one electronic device 1441, 1442, or 1443 and the at least one pixel array 1451, 1452, 1453, or 1454 may communicate with each other and may perform data transmission and reception. For example, each of the at least one pixel array 1451, 1452, 1453, or 1454 may transmit sensing data to each of the at least one electronic device 1441, 1442, or 1443. Each of the at least one electronic device 1441, 1442, or 1443 may determine position information on the user 1401 using the received sensing data. For example, each of the at least one electronic device 1441, 1442, or 1443 may determine that the user 1401 is moving. A TV 1441 may adjust a display in response to the movement of the user 1401, an air conditioner 1442 may adjust an air discharge direction in response to the movement of the user 1401, and a light 1443 may adjust a light emission direction in response to the movement of the user 1401.

As described above, the at least one pixel array 1451, 1452, 1453, or 1454 may include only a sensor array and a communication module and may be disposed at a plurality of portions of the home network 1440 as illustrated in FIG. 14B. The at least one pixel array 1451, 1452, 1453, or 1454 may be detachable.

Figure 15:
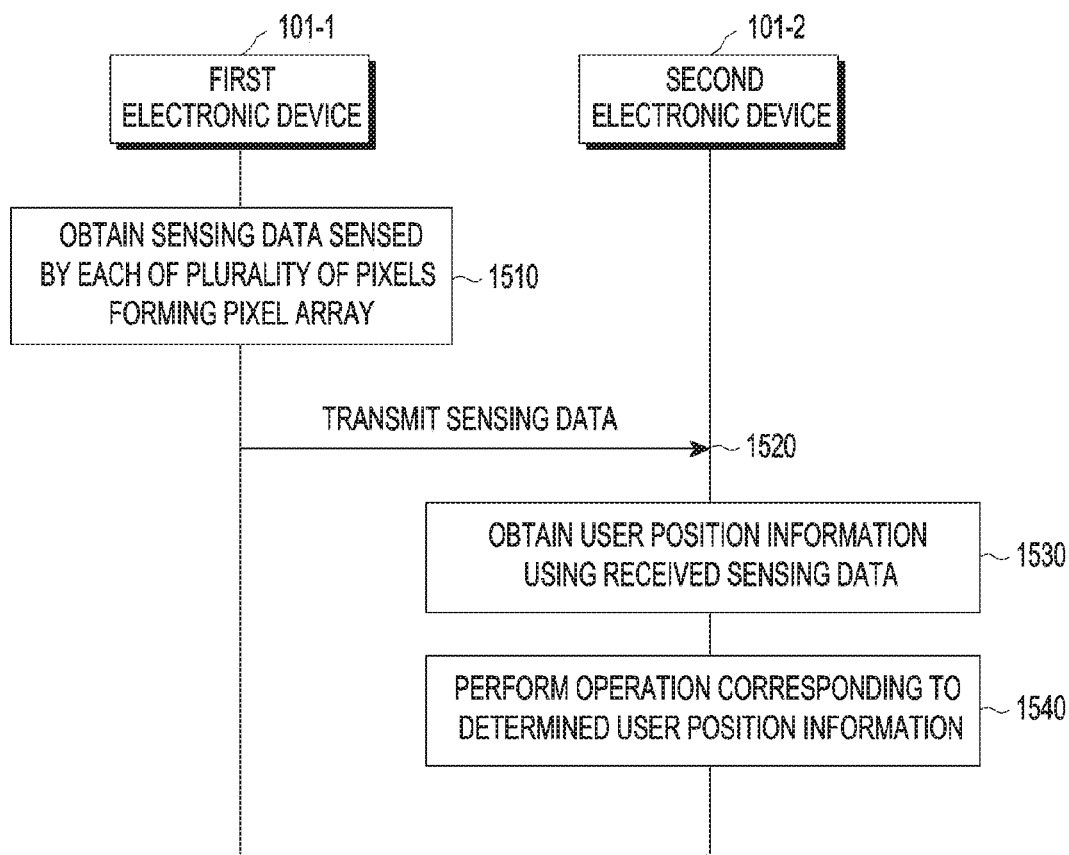
FIG. 15 is a flowchart illustrating a method for controlling an electronic device according to various embodiments of the present disclosure.

FIG. 15 is a flowchart illustrating a method for controlling an electronic device according to various embodiments of the present disclosure.

In operation 1510, a first electronic device 101-1 may obtain sensing data sensed by each of a plurality of pixels forming a pixel array. The first electronic device 101-1 may include a pixel array including a plurality of pixels. In addition, the first electronic device 101-1 may include a communication module capable of transmitting sensing data. In operation 1520, the first electronic device 101-1 may transmit the sensing data.

In operation 1530, a second electronic device 101-2 may obtain user position information using the received sensing data. The second electronic device 101-2 may store in advance information on a relationship between the received sensing data and user position information based on the second electronic device 101-2. The second electronic device 101-2 may determine user position information based on the second electronic device 101-2 using the received sensing data and the information on the relationship. In operation 1540, the second electronic device 101-2 may perform an operation corresponding to the determined user position information.

As described above, an electronic device according to various embodiments of the present disclosure may transmit sensing data sensed by a pixel array including a plurality of pixels to another electronic device. In addition, an electronic device according to various embodiments of the present disclosure may determine user position information based on the electronic device using sensing data, for example, a one-dimensional image, received from another electronic device.

Figure 16:
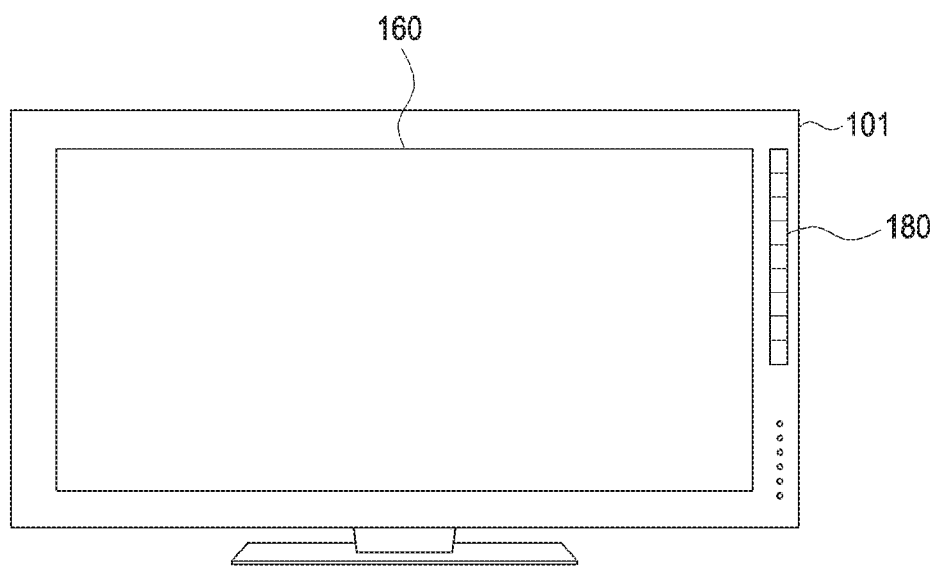
FIG. 16 is a conceptual diagram illustrating an electronic device according to various embodiments of the present disclosure.

FIG. 16 is a conceptual diagram illustrating an electronic device according to various embodiments of the present disclosure. Referring to FIG. 16, the electronic device 101 according to various embodiments of the present disclosure may include a sensor 180 that includes a pixel array extending in a vertical direction. In this case, the electronic device 101 may determine vertical position information on a user and may perform an operation corresponding to the vertical position information on the user. For example, the electronic device 101 may determine the user's gaze using the sensing data from the sensor 180 including the vertical pixel array and may adjust a tilting level according to the height of the user's gaze.

Further, the electronic device 101 may include at least one of a horizontal pixel array and a vertical pixel array, in which case the electronic device 101 may recognize the user's motion by tracking the position of the user. When the electronic device 101 includes a horizontal pixel array, the electronic device 101 may recognize a horizontal motion of the user. When the electronic device 101 includes a vertical pixel array, the electronic device 101 may recognize a vertical motion of the user. When the electronic device 101 includes a horizontal pixel array and a vertical pixel array, the electronic device 101 may recognize a two-dimensional user motion. In addition, as described above, the electronic device 101 may also determine the distance between the user and the electronic device 101 and thus may recognize a three-dimensional user motion.

FIGS. 17 to 21 are conceptual diagrams illustrating the operation of an electronic device in accordance with user position information according to various embodiments of the present disclosure.

Figure 17:
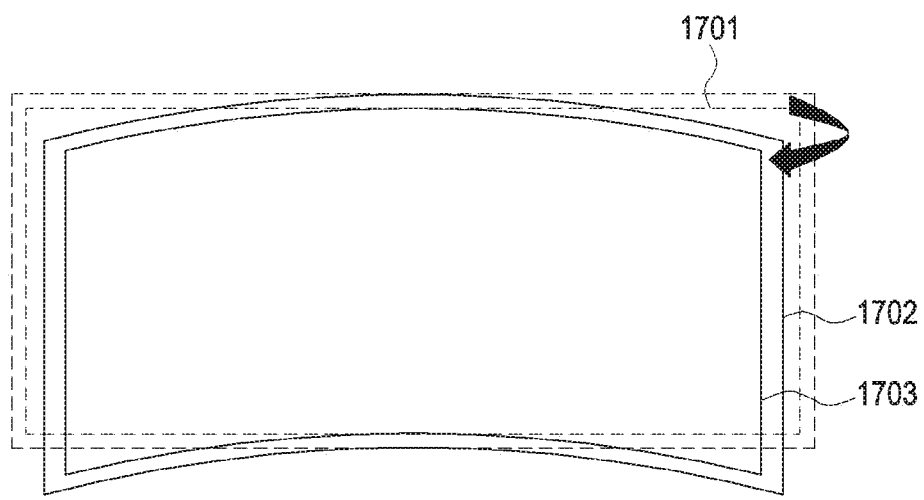
FIGS. 17 to 21 are conceptual diagrams illustrating the operation of an electronic device in accordance with user position information according to various embodiments of the present disclosure.
Figure 17:
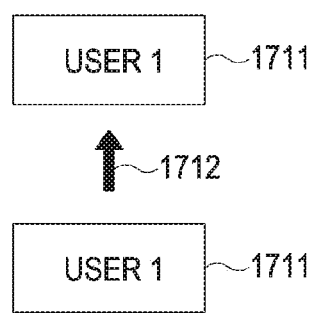

Referring to FIG. 17, an electronic device 101 may include a display 1701. Here, the display 1701 may be formed to be curved. The electronic device 101 may adjust the curvature of the display 1701, and thus may adjust the display 1701 to have a first curvature, may adjust the display 1702 to have a second curvature, or may adjust the display 1703 to have a third curvature.

The electronic device 101 may determine position information on a user 1711 using sensing data sensed by a sensor including a one-dimensional pixel array. As described above, the electronic device 101 may determine information on the distance between the user 1711 and the electronic device 101 using sensing data from one pixel array. Specifically, the electronic device 101 may determine the information on the distance between the user 1711 and the electronic device 101 on the basis of the number of pixels classified as a person in the pixel array or the size of a person in a one-dimensional image. Alternatively, the electronic device 101 may determine the information on the distance between the user 1711 and the electronic device 101 using sensing data sensed by each of a plurality of pixel arrays. Specifically, the electronic device 101 may determine the information on the distance between the user 1711 and the electronic device 101 using the difference between pieces of sensing data sensed by each of the plurality of pixel arrays.

In the embodiment of FIG. 17, the electronic device 101 may determine the approach of the user 1711 to the electronic device 101, that is, movement information indicating a decrease in the distance between the user 1711 and the electronic device 101. Accordingly, the electronic device 101 may adjust the curvature of the display. Further, the electronic device 101 may analyze a user behavior pattern using movement information on the user. The electronic device 101 may identify the user on the basis of the analyzed behavior pattern and may recommend or provide an advertisement using user-specific characteristics.

Further, the electronic device 101 may provide various services, such as adjusting the display brightness of a TV or controlling the turn on/off, on the basis of the distance between the user 1711 and the electronic device 101.

Figure 18:
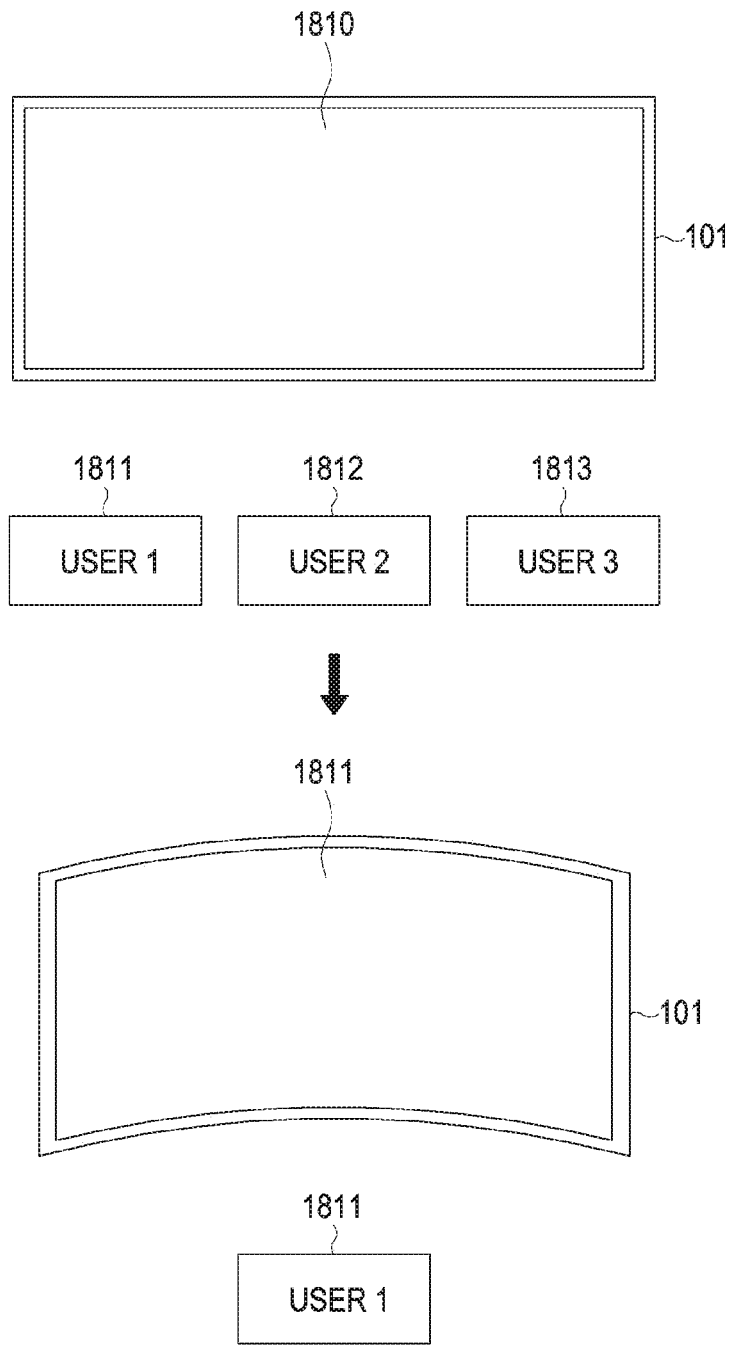

Referring to FIG. 18, the electronic device 101 may include a display having the curvature adjustable. The electronic device 101 may adjust the display 1810 to have a first curvature and may adjust the display 1811 to have a second curvature.

The electronic device 101 may determine the number of users 1821, 1822, and 1823. In various embodiments of the present disclosure, the electronic device 101 may perform person-background separation using sensing data. The electronic device 101 may determine the number of users according to the number of regions classified as a person. For example, as illustrated in the upper portion of FIG. 18, the electronic device 101 may determine that there are three users 1821, 1822, and 1823 and may adjust the curvature of the display 1810 according to the number of users. Further, as illustrated in the lower portion of FIG. 18, the electronic device 101 may determine that there is one user 1821 and may adjust the curvature of the display 1811 according to the number of users.

The electronic device 101 may also recommend a program on the basis of the number of users or may use the presence or absence of a viewer or the number of viewers for a poll.

Figure 19:
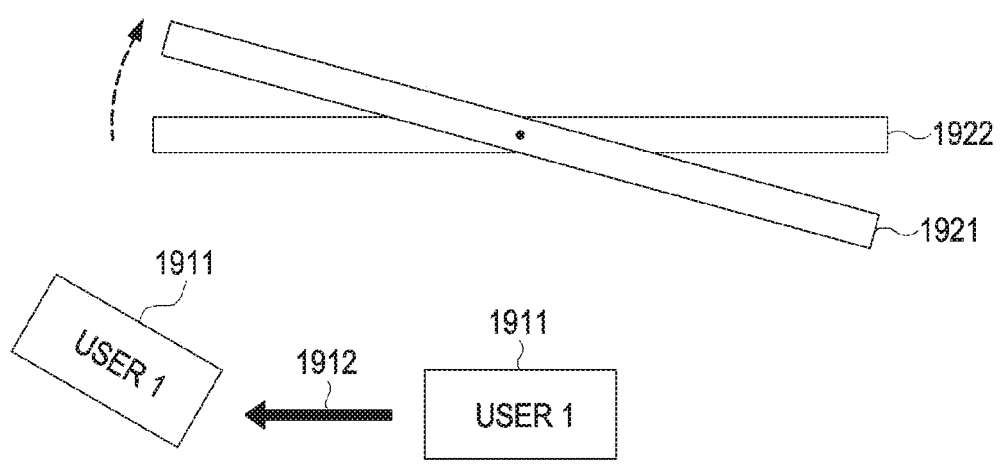

Referring to FIG. 19, the electronic device 101 may include a rotatable display. The electronic device 101 may determine information on the movement 1912 of a user 1911. For example, referring to FIG. 19, the electronic device 101 may determine that the user 1911 moves 1912 relatively to the left. The electronic device 101 may rotate the display 1920 based on the information on the movement 1912 of the user 1911. The electronic device 101 may rotate the display 1920 such that the user 1911 can look straightly at the display 1920.

Figure 20:
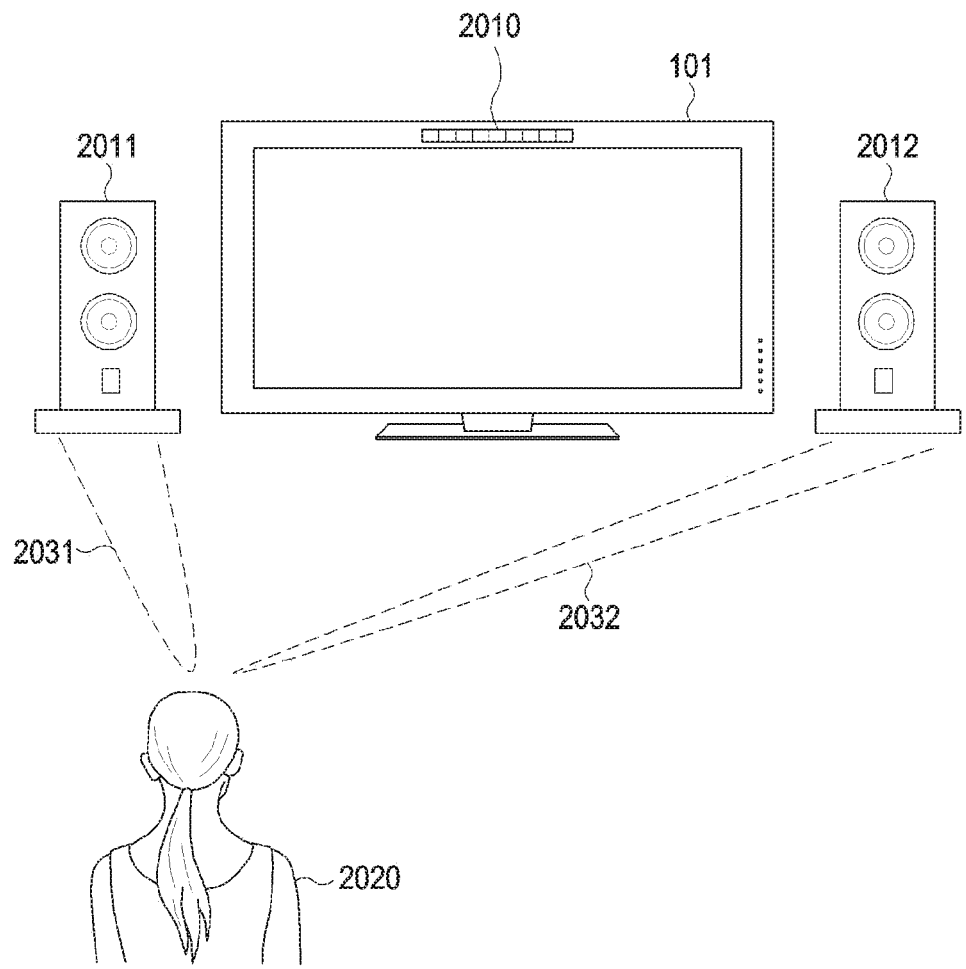

Referring to FIG. 20, the electronic device 101 may include a pixel array 2010. Further, the electronic device 101 may include a plurality of speakers 2011 and 2012. The electronic device 101 may determine position information on a user 2020 using sensing data sensed by the pixel array 2010. The electronic device 101 may determine the direction of beamforming 2031 and 2032 of the plurality of speakers 2011 and 2010 using the position information on the user 2020. The electronic device 101 may adjust the audio output delay of the speakers 2011 and 2010 so that the beamforming 2031 and 2032 is formed to the position of the user 2220.

In various embodiments of the present disclosure, the electronic device 101 may include a plurality of microphones instead of the speakers 2011 and 2012. The electronic device 101 may determine the beamforming direction of the microphones using the determined position information on the user, thus obtaining a more accurate user's voice.

Figure 21:
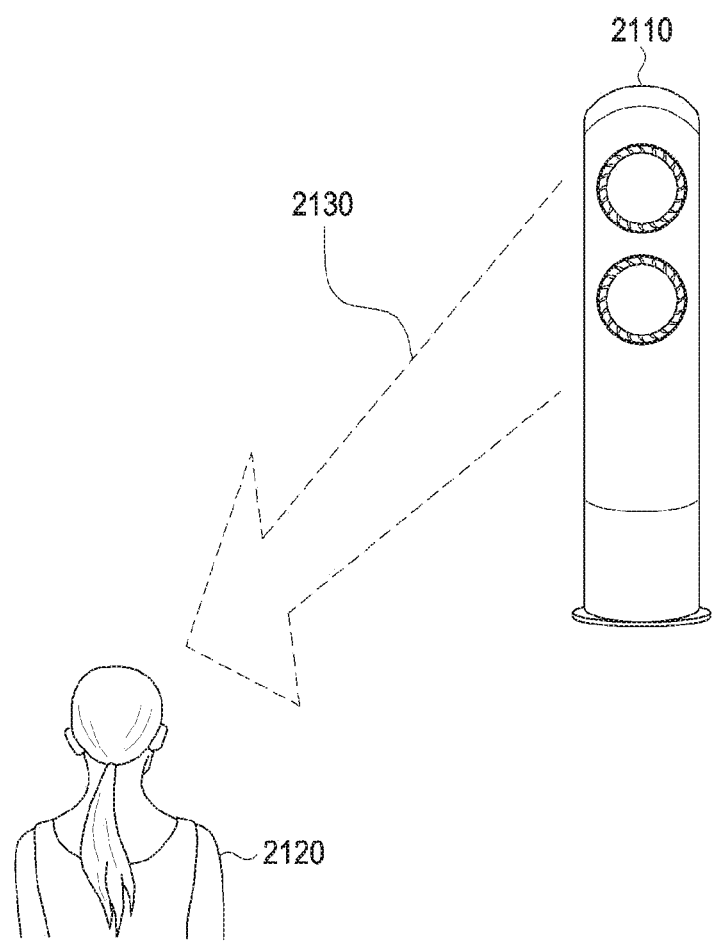

Referring to FIG. 21, the electronic device 101 may determine position information on a user 2120 using sensing data sensed by a pixel array. The electronic device 101 may adjust the discharge direction of air 2130 using the position information on the user 2120.

FIGS. 17 to 21 show various operations corresponding to user position information, which are merely illustrative, and those skilled in the art will readily understand that there is no restriction on the operations that can be performed on the basis of user position information.

According to various embodiments of the present disclosure, a control method of an electronic device including a plurality of pixels disposed in a first direction may include: determining position information on a user using sensing data sensed by the plurality of pixels; and performing an operation corresponding to the position information on the user.

According to various embodiments of the present disclosure, the determining of the position information on the user may include: dividing the plurality of pixels into pixels corresponding to a background and pixels corresponding to a person using the sensing data; and determining the position information on the user on the basis of the pixels corresponding to the person.

According to various embodiments of the present disclosure, the determining of the position information on the user may include: determining a feature point from the sensing data; and dividing the plurality of pixels into the pixels corresponding to the background and the pixels corresponding to the person using the sensing data on the basis of the determined feature point.

According to various embodiments of the present disclosure, the determining of the position information on the user may include: determining a horizontal position or a vertical position of the user on the basis of the positions of the pixels corresponding to the person.

According to various embodiments of the present disclosure, the determining of the position information on the user may include: determining information on the distance between the user and the electronic device on the basis of the number of the pixels corresponding to the person.

According to various embodiments of the present disclosure, each of the plurality of pixels may include a plurality of sub-pixels, and the determining of the position information on the user may include determining information on a distance between the user and the electronic device on the basis of a difference between pieces of sensing data sensed by a plurality of sub-pixels of each of the pixels corresponding to the person According to various embodiments of the present disclosure, the electronic device may include a first pixel array including a plurality of pixels disposed in the first direction and a second pixel array including a plurality of other pixels disposed in the first direction, and the determining of the position information on the user may include determining information on a distance between the user and the electronic device on the basis of a difference between pixels corresponding to the person in the first pixel array and pixels corresponding to the person in the second pixel array.

According to various embodiments of the present disclosure, the determining of the position information on the user may include: applying a stereo vision technique to the pixels corresponding to the person in the first pixel array and the pixels corresponding to the person in the second pixel array; and determining the information on the distance between the user and the electronic device on the basis of an application result.

According to various embodiments of the present disclosure, the determining of the position information on the user may include: comparing the sensing data with a reference database; and determining the position information on the user using a comparison result.

According to various embodiments of the present disclosure, the determining of the position information on the user may include: generating a difference image between the sensing data and the reference database; dividing a plurality of pixels of the difference image into pixels corresponding to the background and pixels corresponding to the person; and determining the position information on the user on the basis of the pixels corresponding to the person.

According to various embodiments of the present disclosure, each of the plurality of pixels may sense a plurality of pieces of sensing data over time, and the determining of the position information on the user may include: dividing the plurality of pixels into pixels corresponding to the background and pixels corresponding to the person using each of the plurality of pieces of sensing data sensed over time; and determining movement information on the user on the basis of a change in the pixels corresponding to the person over time.

Each of the components of the electronic device according to the present disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various embodiments of the present disclosure, a storage medium may store instructions, wherein the instructions may be configured for at least one processor to perform at least one operation when executed by the at least one processor, the at least one operation including: determining position information on a user using sensing data sensed by a plurality of pixels; and performing an operation corresponding to the position information on the user.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The invention claimed is:

1. An electronic device comprising:
a sensor comprising a plurality of regions having a plurality of pixels disposed in a first direction;
a processor electrically connected to the sensor; and
a memory electrically connected to the processor,
wherein the memory is configured to store instructions that, when executed, cause the processor to:
determine position information on a user using sensing data sensed via the sensor by determining a distance between the user and the electronic device based on a number of regions among the plurality of regions of the sensor classified as a person, and
perform an operation corresponding to the position information comprising the distance,
wherein, as the distance between the user and the electronic device increases, the number of regions classified as a person decreases,
wherein, as the distance between the user and the electronic device decreases, the number of regions classified as a person increases, and
wherein the instructions, when executed, further cause the processor to:
analyze the sensing data sensed via the sensor,
based on the analyzing of the sensing data, determine whether at least one region among the plurality of regions of the sensor is classified as a person and determine whether at least one region among the plurality of regions of the sensor is classified as a background,
based on at least one region among the plurality of regions being classified as a person, determine a number of the at least one region among the plurality of regions of the sensor classified as a person, and determine the distance between the user and the electronic device based on the number of the at least one region among the plurality of regions of the sensor classified as a person.

2. The electronic device of claim 1, wherein the instructions, when executed, further cause the processor to:
divide the plurality of pixels into pixels corresponding to the background and the pixels corresponding to the user using the sensing data, and
determine the position information on the user based on the pixels corresponding to the user.

3. The electronic device of claim 2, wherein the instructions, when executed, further cause the processor to:
determine a feature point from the sensing data, and
divide the plurality of pixels into the pixels corresponding to the background and the pixels corresponding to the user based on the determined feature point.

4. The electronic device of claim 2, wherein the instructions, when executed, further cause the processor to determine a horizontal position or a vertical position of the user based on positions of the pixels corresponding to the user.

5. The electronic device of claim 2,
wherein each of the plurality of pixels of the sensor comprises a plurality of sub-pixels, and
wherein the instructions, when executed, further cause the processor to determine information on the distance between the user and the electronic device based on a difference between pieces of sensing data sensed by a plurality of sub-pixels of each of the pixels corresponding to the user.

6. The electronic device of claim 2,
wherein the sensor further comprises:
a first pixel array comprising pixels disposed in the first direction, and
a second pixel array comprising other pixels disposed in the first direction, and
wherein the instructions, when executed, further cause the processor to determine information on the distance between the user and the electronic device based on a difference between pixels corresponding to the user in the first pixel array and pixels corresponding to the user in the second pixel array.

7. The electronic device of claim 6, wherein the instructions, when executed, further cause the processor to:
apply a stereo vision technique to the pixels corresponding to the user in the first pixel array and the pixels corresponding to the user in the second pixel array, and
determine the information on the distance between the user and the electronic device based on a result of applying the stereo vision technique to the pixels corresponding to the user in the first pixel array and the pixels corresponding to the user in the second pixel array.

8. The electronic device of claim 2,
wherein the memory is further configured to store, in advance, a reference database associated with the sensing data, and
wherein the instructions, when executed, further cause the processor to:
compare the sensing data with the reference database, and
determine the position information on the user based on a result of comparing the sensing data with the reference database.

9. The electronic device of claim 8, wherein the instructions, when executed, further cause the processor to:
generate a difference image between the sensing data and the reference database,
divide a plurality of pixels of the difference image into pixels corresponding to the background and pixels corresponding to the user, and
determine the position information on the user based on the pixels corresponding to the user.

10. The electronic device of claim 2,
wherein the sensor is configured to sense a plurality of pieces of sensing data over time, and
wherein the instructions, when executed, further cause the processor to:
divide the plurality of pixels into pixels corresponding to the background and pixels corresponding to the user using each of the plurality of pieces of sensing data sensed over time, and
determine movement information on the user based on a change over time in the pixels corresponding to the user.

11. A control method of an electronic device comprising a sensor including a plurality of regions having a plurality of pixels disposed in a first direction, the method comprising:
determining position information on a user using sensing data sensed via the plurality of pixels by determining a distance between the user and the electronic device based on a number of regions among the plurality of regions of the sensor classified as a person; and
performing an operation corresponding to the position information comprising the distance,
wherein, as the distance between the user and the electronic device increases, the number of regions classified as a person decreases,
wherein, as the distance between the user and the electronic device decreases, the number of regions classified as a person increases, and
wherein the method further comprises:
analyzing the sensing data sensed via the sensor;
based on the analyzing of the sensing data, determining whether at least one region among the plurality of regions of the sensor is classified as a person and determining whether at least one region among the plurality of regions of the sensor is classified as a background;
based on at least one region among the plurality of regions being classified as a person, determining a number of the at least one region among the plurality of regions of the sensor classified as a person; and
determining the distance between the user and the electronic device based on the number of the at least one region among the plurality of regions of the sensor classified as a person.

12. The method of claim 11, further comprising:
dividing the plurality of pixels into pixels corresponding to the background and the pixels corresponding to the user using the sensing data; and
determining the position information on the user based on the pixels corresponding to the user.

13. The method of claim 12, further comprising:
determining a feature point from the sensing data; and
dividing the plurality of pixels into the pixels corresponding to the background and the pixels corresponding to the user based on the determined feature point.

14. The method of claim 12, further comprising determining a horizontal position or a vertical position of the user based on the pixels corresponding to the user.

15. The method of claim 12,
wherein each of the plurality of pixels comprises a plurality of sub-pixels, and
wherein the method further comprises determining information on the distance between the user and the electronic device based on a difference between pieces of sensing data sensed by a plurality of sub-pixels of each of the pixels corresponding to the user.

16. The method of claim 12,
wherein the electronic device further comprises:
- a first pixel array comprising a plurality of pixels disposed in the first direction, and
- a second pixel array comprising a plurality of other pixels disposed in the first direction, and wherein the method further comprises determining information on the distance between the user and the electronic device based on a difference between pixels corresponding to the user in the first pixel array and pixels corresponding to the user in the second pixel array.

17. The method of claim 16, further comprising:

applying a stereo vision technique to the pixels corresponding to the user in the first pixel array and the pixels corresponding to the user in the second pixel array; and determining the information on the distance between the user and the electronic device based on a result of applying the stereo vision technique to the pixels corresponding to the user in the first pixel array and the pixels corresponding to the user in the second pixel array.

18. The method of claim 12, further comprising:

comparing the sensing data with a reference database; and determining the position information on the user based on a result of comparing the sensing data with the reference database.

* * * * *